(12) United States Patent
Wang et al.

(10) Patent No.: US 11,653,300 B2
(45) Date of Patent: May 16, 2023

(54) HANDLING OF HARQ AND RETRANSMISSION TIMERS FOR SIDELINK DRX OPERATIONS

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,659

(22) Filed: Jul. 27, 2021

(65) Prior Publication Data
US 2023/0032717 A1     Feb. 2, 2023

(51) Int. Cl.
*H04W 4/00*           (2018.01)
*H04W 52/02*        (2009.01)
(Continued)

(52) U.S. Cl.
CPC ....... *H04W 52/0216* (2013.01); *H04L 1/1678* (2013.01); *H04W 52/0238* (2013.01); *H04W 72/1263* (2013.01)

(58) Field of Classification Search
CPC ......... H04W 52/0216; H04W 52/0238; H04W 72/1263; H04L 1/1678
See application file for complete search history.

(56) References Cited

U.S. PATENT DOCUMENTS

2019/0052413 A1*   2/2019   Babaei ................. H04L 1/1812
2020/0314940 A1*   10/2020   Park ...................... H04W 80/02
(Continued)

FOREIGN PATENT DOCUMENTS

DE        102021108923 A1 * 10/2021 ........... H04L 5/0053
WO    WO-2021119474 A1 * 6/2021 ............ H04W 76/28
(Continued)

OTHER PUBLICATIONS

International Search Report and Written Opinion—PCT/US2022/073833—ISA/EPO—dated Oct. 28, 2022.
(Continued)

*Primary Examiner* — Chi H Pham
*Assistant Examiner* — Elisabeth Benoit Magloire
(74) *Attorney, Agent, or Firm* — Patterson + Sheridan, L.L.P.

(57) ABSTRACT

Certain aspects of the present disclosure provide techniques for handling acknowledgement and retransmission timers during sidelink discontinuous reception (DRX) communication. An example method by a transmitter user equipment (UE) generally includes transmitting a first repetition of a physical sidelink shared channel (PSSCH) to a receiver UE prior to entering an inactive state, while the transmitter UE is operating in a sidelink discontinuous reception (DRX) mode; returning to an active state to monitor for acknowledgment feedback from the receiver UE, wherein the return is based on a first timer relative to an end of the first repetition of the PSSCH; remaining in the active state for a duration defined by a second timer; and taking one or more actions depending on whether the transmitter UE receives acknowledgment feedback during the duration indicating failed reception of the first repetition of the PSSCH by the receiver UE.

30 Claims, 15 Drawing Sheets

(51) Int. Cl.
*H04W 72/1263* (2023.01)
*H04L 1/1607* (2023.01)

(56) References Cited

U.S. PATENT DOCUMENTS

| | | | | |
|---|---|---|---|---|
| 2020/0367167 | A1* | 11/2020 | Nam | H04W 8/24 |
| 2020/0404735 | A1* | 12/2020 | Nam | H04W 76/28 |
| 2021/0050953 | A1* | 2/2021 | Park | H04L 5/0094 |
| 2021/0227602 | A1 | 7/2021 | Li et al. | |
| 2021/0306948 | A1* | 9/2021 | Ding | H04L 1/1812 |
| 2021/0400762 | A1* | 12/2021 | Jeong | H04W 76/28 |
| 2021/0410063 | A1* | 12/2021 | Bao | H04W 52/0216 |
| 2021/0410098 | A1* | 12/2021 | Bao | H04W 52/028 |
| 2022/0046430 | A1* | 2/2022 | Liu | H04W 24/10 |
| 2022/0053340 | A1* | 2/2022 | Ryu | H04W 24/08 |
| 2022/0110060 | A1* | 4/2022 | Yang | H04W 72/02 |
| 2022/0272789 | A1* | 8/2022 | Wang | H04W 52/0216 |

FOREIGN PATENT DOCUMENTS

| | | | |
|---|---|---|---|
| WO | WO-2021165161 A1 | * | 8/2021 |
| WO | WO-2021230700 A1 | * | 11/2021 |

OTHER PUBLICATIONS

XIAOMI: "Discussion on Sidelink DRX Timer Handling", 3GPP TSG-RAN WG2 Meeting #113e, R2-2101600, 3rd Generation Partnership Project, Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021, XP051974478, section 2, 4 Pages.

* cited by examiner

HANDLING OF HARQ AND RETRANSMISSION TIMERS FOR SIDELINK DRX OPERATIONS

BACKGROUND

Field of the Disclosure

Aspects of the present disclosure relate to wireless communications, and more particularly, to techniques for handling retransmissions in sidelink communication.

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, or other resources). Multiple-access technologies can rely on any of code division, time division, frequency division, orthogonal frequency division, single-carrier frequency division, or time division synchronous code division multiple access (TD-SCDMA) systems, to name a few. These and other multiple access technologies have been adopted in various telecommunication standards to provide a common protocol that enables different wireless devices to communicate on a municipal, national, regional, and even global level.

Sidelink communications are communications from one UE to another UE. As the demand for mobile broadband access continues to increase, there exists a need for further improvements in NR and LTE technology, including improvements to sidelink communications. These improvements should be applicable to other multi-access technologies and the telecommunication standards that employ these technologies.

SUMMARY

Certain aspects can be implemented in a method for wireless communication by a transmitter user equipment (UE) for sidelink communication with other UEs. The method generally includes transmitting a first repetition of a physical sidelink shared channel (PSSCH) to a receiver UE prior to entering an inactive state, while the transmitter UE is operating in a sidelink discontinuous reception (DRX) mode; returning to an active state to monitor for acknowledgment feedback from the receiver UE, wherein the return is based on a first timer relative to an end of the first repetition of the PSSCH; remaining in the active state for a duration defined by a second timer; and taking one or more actions depending on whether the transmitter UE receives acknowledgment feedback during the duration indicating failed reception of the first repetition of the PSSCH by the receiver UE.

Certain aspects of the present disclosure are directed to an apparatus for wireless communication by a transmitter UE. The apparatus generally includes a memory and at least one processor coupled to the memory, the memory and the at least one processor being configured to transmit a first repetition of a PSSCH to a receiver UE prior to entering an inactive state, while the transmitter UE is operating in a sidelink DRX mode; returning to an active state to monitor for acknowledgment feedback from the receiver UE, wherein the return is based on a first timer relative to an end of the first repetition of the PSSCH; remaining in the active state for a duration defined by a second timer; and taking one or more actions depending on whether the transmitter UE receives acknowledgment feedback during the duration indicating failed reception of the first repetition of the PSSCH by the receiver UE.

Certain aspects can be implemented in an apparatus for wireless communication by a transmitter UE. The apparatus may include means for transmitting a first repetition of a PSSCH to a receiver UE prior to entering an inactive state, while the transmitter UE is operating in a sidelink DRX mode; means for returning to an active state to monitor for acknowledgment feedback from the receiver UE, wherein the return is based on a first timer relative to an end of the first repetition of the PSSCH; means for remaining in the active state for a duration defined by a second timer; and means for taking one or more actions depending on whether the transmitter UE receives acknowledgment feedback during the duration indicating failed reception of the first repetition of the PSSCH by the receiver UE.

Certain aspects can be implemented in a computer readable medium having instructions stored thereon for transmitting a first repetition of a PSSCH to a receiver UE prior to entering an inactive state, while the transmitter UE is operating in a sidelink DRX mode; returning to an active state to monitor for acknowledgment feedback from the receiver UE, wherein the return is based on a first timer relative to an end of the first repetition of the PSSCH; remaining in the active state for a duration defined by a second timer; and taking one or more actions depending on whether the transmitter UE receives acknowledgment feedback during the duration indicating failed reception of the first repetition of the PSSCH by the receiver UE.

Certain aspects can be implemented in a method for wireless communication by a receiver UE for sidelink communication with other UEs. The method generally includes monitoring for a first repetition of a PSSCH from a transmitter UE prior to entering an inactive state, while the receiver UE is operating in a sidelink DRX mode; transmitting acknowledgment feedback to the transmitter UE indicating failed reception of the first repetition of the PSSCH; returning to an active state after transmitting the acknowledgment feedback, wherein the return is based on a first timer relative to an end of the acknowledgment feedback transmission; and remaining in the active state for a duration defined by a second timer to monitor for a second repetition of the PSSCH.

Certain aspects of the present disclosure are directed to an apparatus for wireless communication by a receiver UE. The apparatus generally includes a memory and at least one processor coupled to the memory, the memory and the at least one processor being configured to monitor for a first repetition of a PSSCH from a transmitter UE prior to entering an inactive state, while the receiver UE is operating in a sidelink DRX mode; transmit acknowledgment feedback to the transmitter UE indicating failed reception of the first repetition of the PSSCH; return to an active state after transmitting the acknowledgment feedback, wherein the return is based on a first timer relative to an end of the acknowledgment feedback transmission; and remain in the active state for a duration defined by a second timer to monitor for a second repetition of the PSSCH.

Certain aspects can be implemented in an apparatus for wireless communication by a receiver UE. The apparatus may include means for monitoring for a first repetition of a PSSCH from a transmitter UE prior to entering an inactive state, while the receiver UE is operating in a sidelink DRX mode; means for transmitting acknowledgment feedback to the transmitter UE indicating failed reception of the first repetition of the PSSCH; means for returning to an active state after transmitting the acknowledgment feedback, wherein the return is based on a first timer relative to an end of the acknowledgment feedback transmission; and means for remaining in the active state for a duration defined by a second timer to monitor for a second repetition of the PSSCH.

Certain aspects can be implemented in a computer readable medium having instructions stored thereon for monitoring for a first repetition of a PSSCH from a transmitter UE prior to entering an inactive state, while the receiver UE is operating in a sidelink DRX mode; transmitting acknowledgment feedback to the transmitter UE indicating failed reception of the first repetition of the PSSCH; returning to an active state after transmitting the acknowledgment feedback, wherein the return is based on a first timer relative to an end of the acknowledgment feedback transmission; and remaining in the active state for a duration defined by a second timer to monitor for a second repetition of the PSSCH.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for handling retransmissions in sidelink communication. For example, a user equipment (UE) may implement of hybrid automatic repeat request (HARD) timer and a retransmission timer during sidelink discontinuous reception (DRX) operations to manage retransmission of failed transmissions.

Introduction to Wireless Communication Networks

Figure 1:
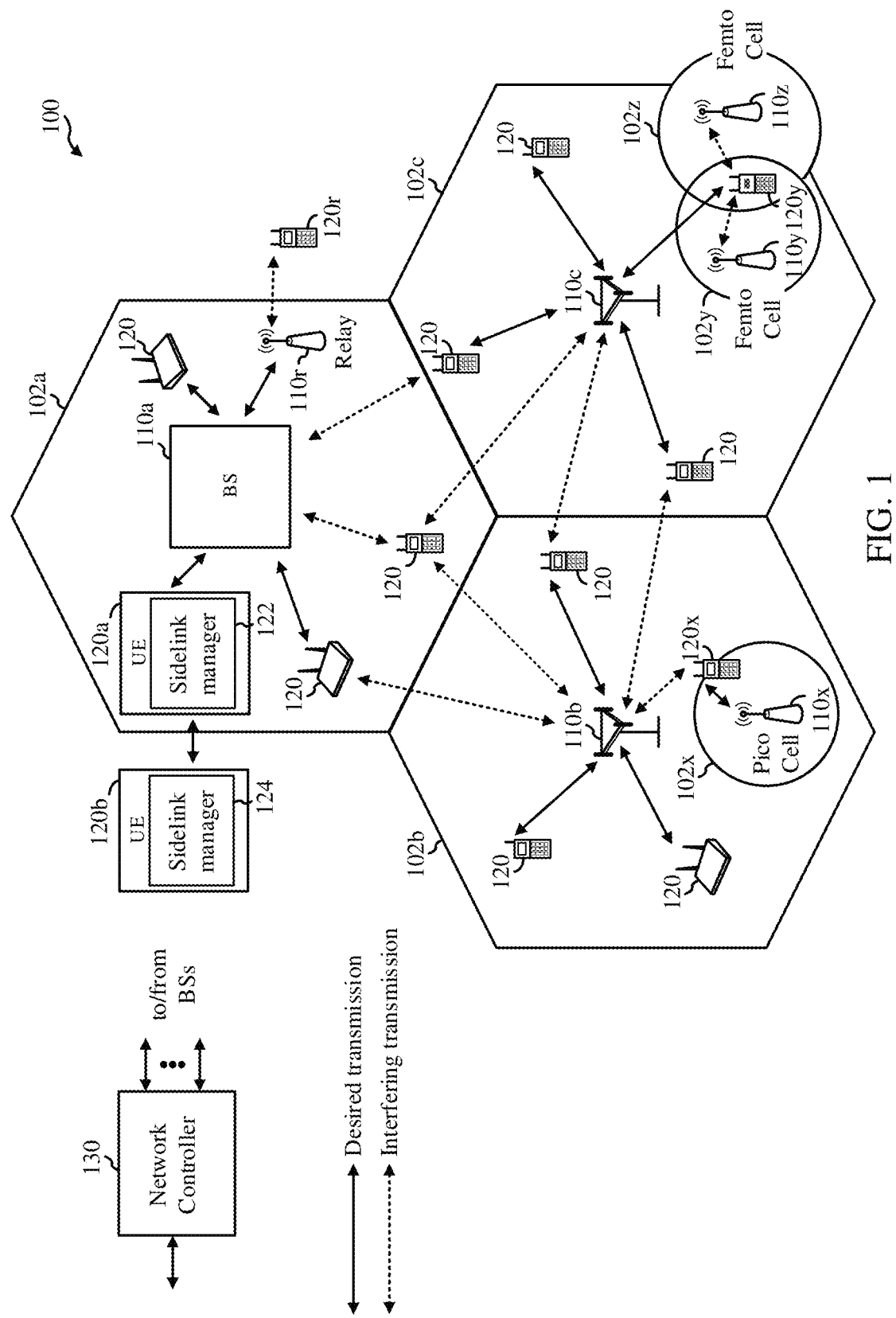
FIG. 1 is a block diagram conceptually illustrating an example telecommunications system, in accordance with certain aspects of the present disclosure.

FIG. 1 illustrates an example of a wireless communication network 100 (e.g., an NR/5G network) in which aspects described herein may be implemented.

For example, a user equipment (UE) 120a, a UE 120b, and/or a base station (BS) 110a of FIG. 1 may be configured to perform operations described below with reference to FIG. 7 and/or FIG. 8 to handle acknowledgement and retransmission timers during sidelink discontinuous reception (DRX) communication.

As illustrated in FIG. 1, the wireless communication network 100 may include a number of BSs 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to recover a sidelink communication from another UE. As shown in FIG. 1, UE 120a includes a sidelink manager 122 and UE 120b includes a sidelink manager 124. The sidelink managers 122 and 124 may be configured to transmit a sidelink communication to each other or another UE, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
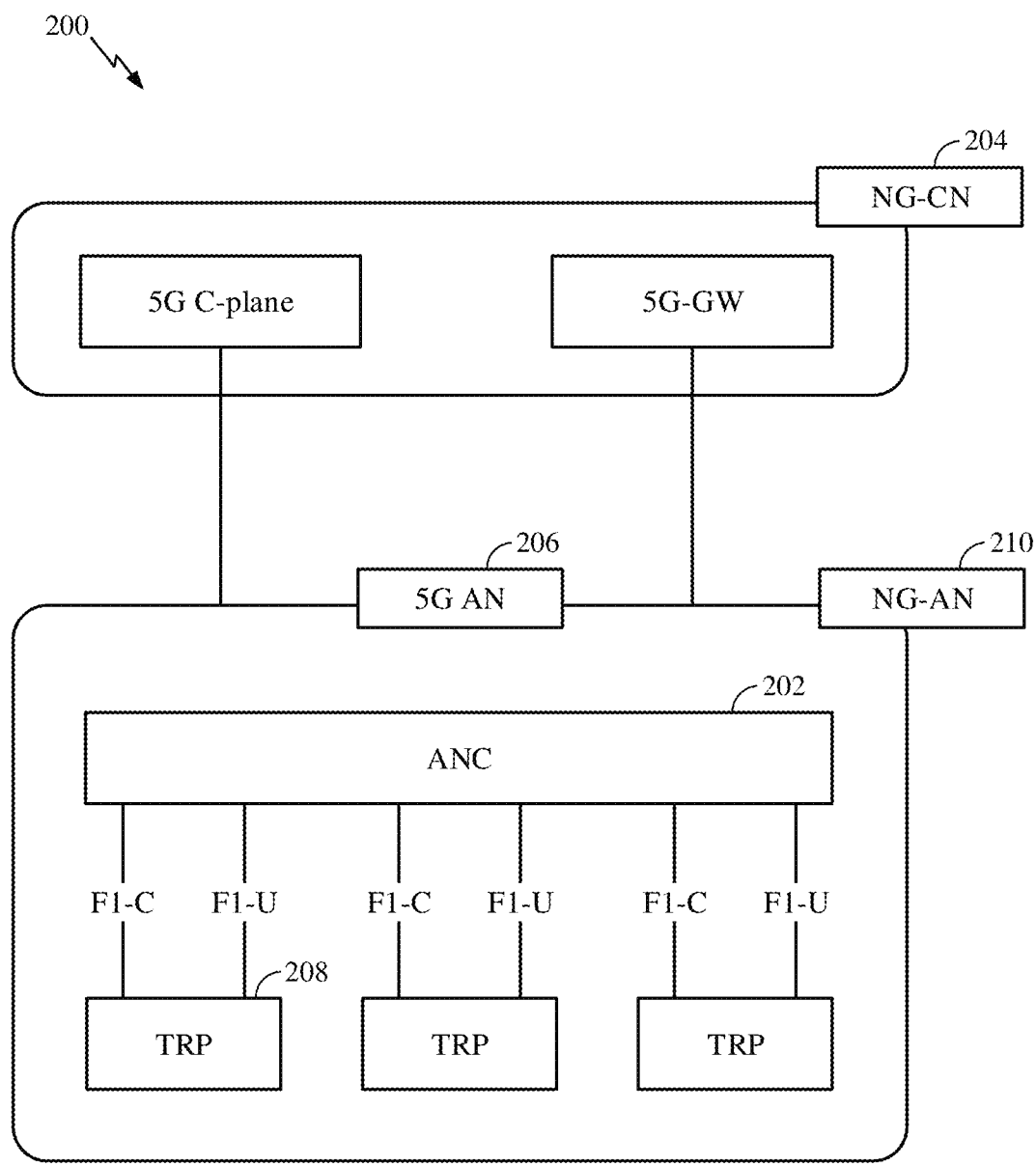
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/ or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
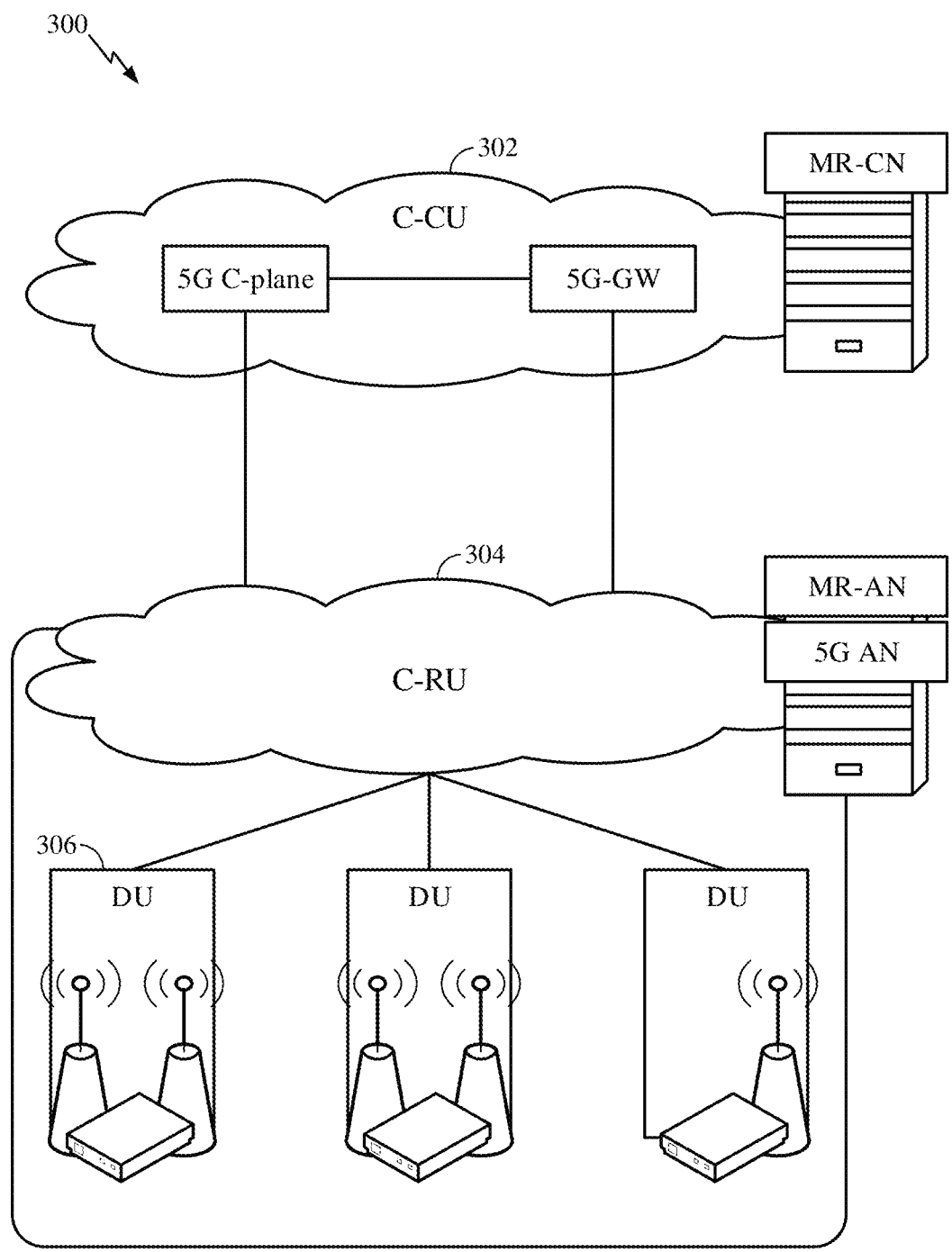
FIG. 3 is a diagram illustrating an example physical architecture of a distributed RAN, in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
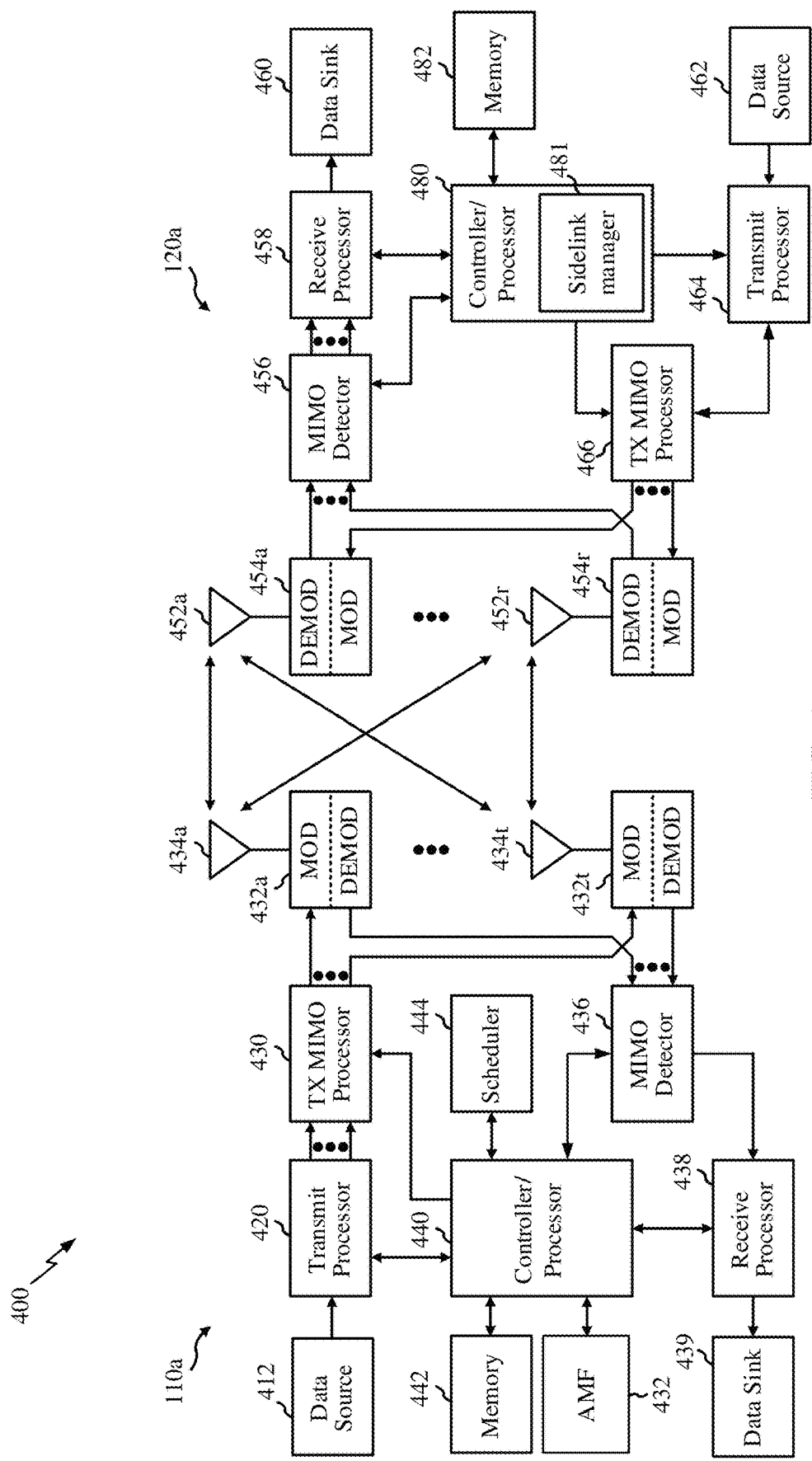
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/ processor 480 of the UE 120a and/or antennas 434, processors 420, 430, 438, and/or controller/processor 440 of the BS 110a may be used to perform the various techniques and methods described herein with reference to FIGS. 7-15.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the UL, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the BS 110*a*. At the BS 110*a*, the UL signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein. As shown in FIG. 2, the controller/processor 480 of the UE 120*a* has a sidelink manager 481 that may be configured for transmitting a sidelink communication to another UE. Although shown at the controller/processor 480 and controller/processor 440, other components of the UE 120*a* and BS 110*a* may be used performing the operations described herein. The memories 442 and 482 may store data and program codes for BS 110*a* and UE 120*a*, respectively. A scheduler 444 may schedule UEs for data transmission on the DL, sidelink, and/or UL.

Example Sidelink Communications

While communication between user equipments (UEs) (e.g., UE 120 of FIGS. 1 and 4) and base stations (BSs) (e.g., BSs 110 of FIGS. 1 and 4) may be referred to as the access link, and the access link may be provided via a cellular (Uu) interface, communication between devices may be referred to as the sidelink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5A:
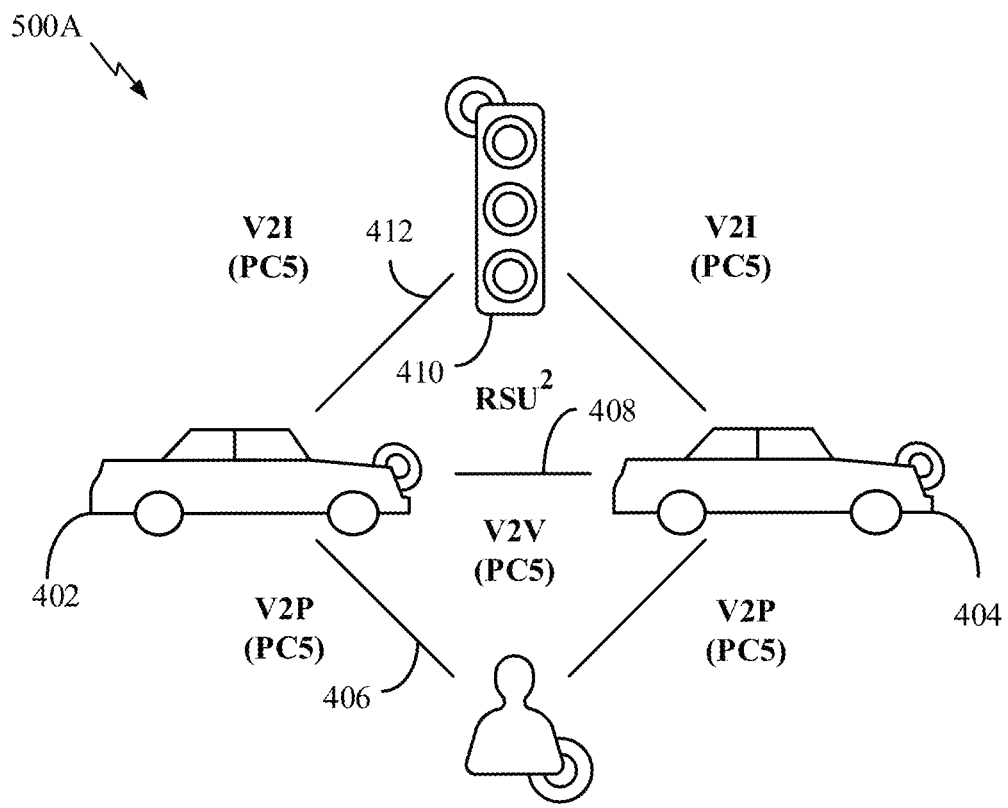
FIGS. 5A and 5B show diagrammatic representations of example vehicle to everything (V2X) systems, in accordance with certain aspects of the present disclosure.
Figure 5B:
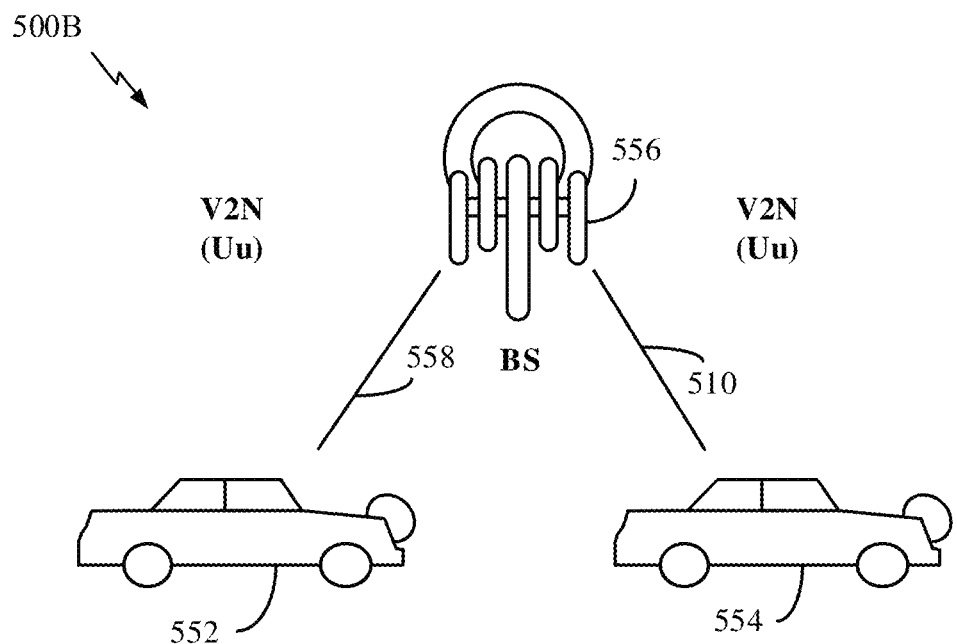

FIGS. 5A and 5B show diagrammatic representations of example vehicle to everything (V2X) systems, in accordance with certain aspects of the present disclosure. For example, the vehicles shown in FIGS. 5A and 5B may communicate via sidelink channels and may perform sidelink channel state information (C SI) reporting as described herein.

V2X systems, provided in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500A (for example, including vehicle-to-vehicle (V2V) communications) is illustrated with two vehicles 502, 504. The first transmission mode may allow for direct communication between different participants in a given geographic location. As illustrated, a vehicle may have a wireless communication link 506 with an individual (i.e., vehicle to pedestrian (V2P)) (for example, via a UE) through a PC5 interface. Communications between vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 500B for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks (WLANs), which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as CSI related to a sidelink channel quality. A sequence-based PSFCH format with one symbol (not including automatic gain control (AGC) training period) may be supported. The following formats may be possible: a PSFCH format based on PUCCH format 2 and a PSFCH format spanning all available symbols for sidelink in a slot.

Figure 6:
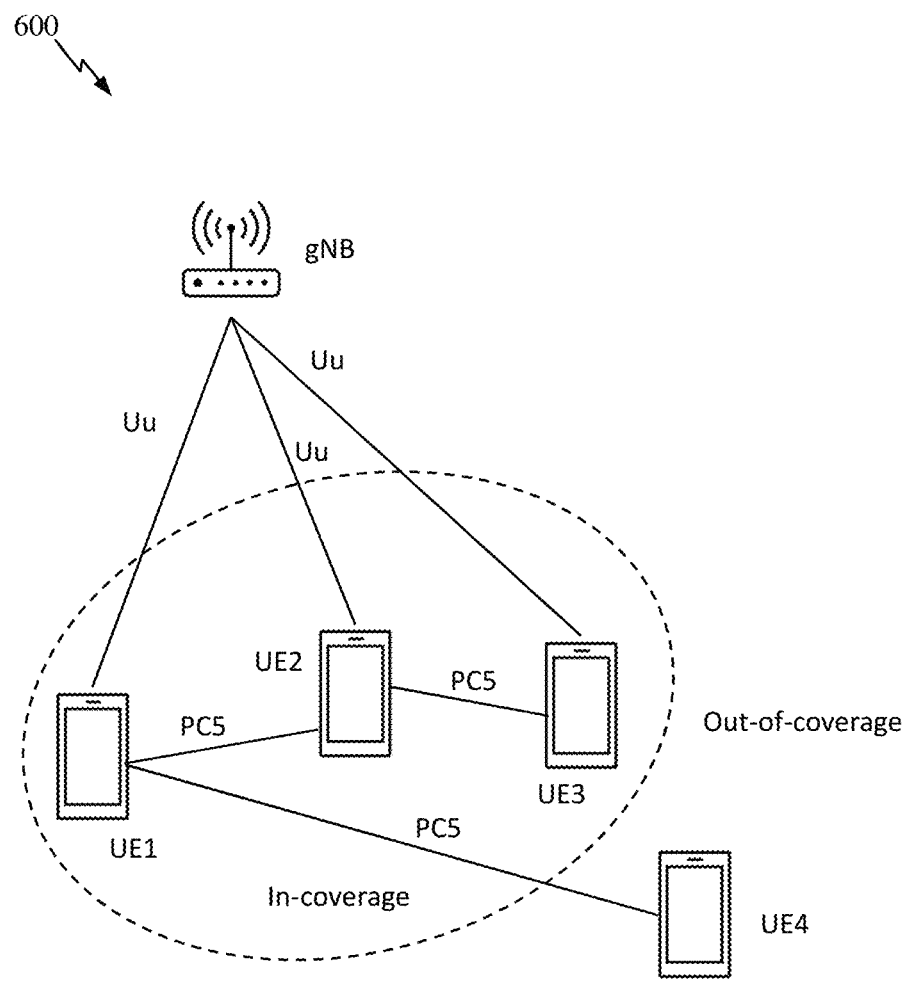
FIG. 6 illustrates a diagrammatic representation of an example deployment implementing sidelink and cellular communication, in accordance with certain aspects of the present disclosure.

Example Techniques for Handling of HARQ and Retransmission Timers for Sidelink DRX FIG. 6 illustrates a diagrammatic representation of an example deployment 600 implementing sidelink communication (e.g., PC5) and cellular communication (Uu), in accordance with certain aspects of the present disclosure. In certain aspects, the deployment 600 may be understood to be a more general version of the systems 500A and 500B of FIGS. 5A and 5B.

As shown, multiple UEs (e.g., UE1, UE2, UE3, and UE4) can have direct (e.g., sidelink) communication with one another without needing to go through a BS (e.g., the gNB). Further, this can be accomplished even for UEs that are out of coverage from a gNB (e.g., UE4). In some cases, the UEs (e.g., UE1, UE2, UE3, and UE4) communicating via sidelink may use sidelink discontinuous reception (DRX) to save power.

Aspects of the present disclosure provide techniques that may help coordinate retransmissions for sidelink communications between UEs, such as those shown in FIG. 6, while in DRX modes. For example, such UEs may implement of hybrid automatic repeat request (HARQ) timer and a retransmission during sidelink DRX operations to manage retransmission of failed transmissions.

In general, timer-based sidelink DRX is used in sidelink radio resource control (RRC) connected mode. In some systems (e.g., Release 17), RRC connected mode may be the only mode in which timer-based sidelink DRX is supported. Sidelink DRX may be applied to both regular data transmission and paging messages.

Sidelink DRX operation typically involves ON slots and OFF slots. During the ON slots, the UE is in an active state where the UE may transmit and/or monitor for signals. In OFF slots, the UE enters a sleep (or inactive) state during which the UE does not monitor a physical sidelink control channel (PSCCH). Additionally, a UE may not be permitted to interrupt the inactive state to transmit to another UE. This is different from a typical cellular (Uu) interface, as the destination UE is not monitoring PSCCH. Further, it may be assumed that a source UE and a destination UE have aligned active (common ON) times. That is, the source UE and/or the destination UE may be active during a common ON period.

Sidelink DRX generally helps UEs save on power consumption. Further, a UE may return to an active state temporarily after (a first/initial) data transmission/reception to perform a potential data retransmission of the first data transmission. Accordingly, certain aspects are generally directed to proposals for handling of timers that correspond to such data retransmissions during sidelink DRX.

Figure 7:
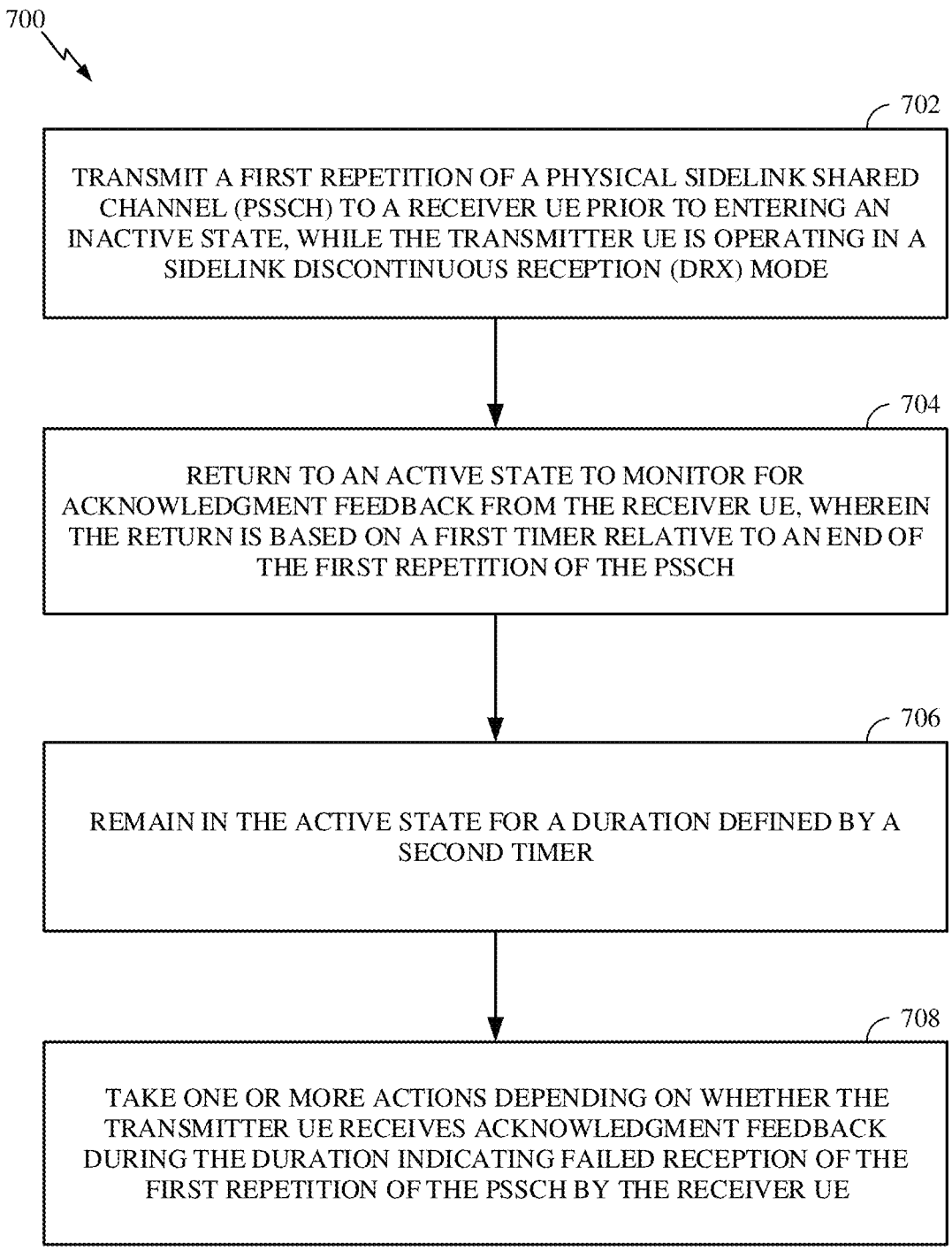
FIG. 7 illustrates example operations for wireless communications by a receiver UE, in accordance with certain aspects of the present disclosure.

FIG. 7 is a flow diagram illustrating example operations 700 for wireless communication by a transmitter UE, in accordance with certain aspects of the present disclosure. The operations 700 may be performed, for example, by a transmitter UE (e.g., UE 120a or 120b of FIG. 1 or UE 120a of FIG. 4) to handle timers in sidelink communication with a receiver UE. The operations 700 may be implemented as software components that are executed and run on one or more processors (e.g., controller/processor 480 of FIG. 4). Further, the transmission and reception of signals by the transmitter UE in operations 700 may be enabled, for example, by one or more antennas (e.g., antennas 452 of FIG. 4). In certain aspects, the transmission and/or reception of signals by the transmitter UE may be implemented via a bus interface of one or more processors (e.g., controller/processor 480 of FIG. 4) obtaining and/or outputting signals.

The operations 700 begin, at 702, by transmitting a first repetition of a physical sidelink shared channel (PSSCH) to receiver UE prior to entering an inactive state, while the transmitter UE is operating in a sidelink DRX mode.

At 704, the transmitter UE returns to an active state to monitor for acknowledgment feedback from the receiver UE, wherein the return is based on a first timer relative to an end of the first repetition of the PSSCH.

At 706, the transmitter UE remains in the active state for a duration defined by a second timer. In some cases, the first and second timers are set such that transmitter UE transmits a second repetition of the PSSCH when the receiver UE is in an active state and/or such that the transmitter UE is in an active state when the receiver UE is configured to send acknowledgment feedback.

At 708, the transmitter UE takes one or more actions depending on whether the transmitter UE receives acknowledgment feedback during the duration indicating failed reception of the first repetition of the PSSCH by the receiver UE. For example, the transmitter UE may return to the inactive state unless the UE receives acknowledgment feedback during the duration indicating failed reception of the first repetition of the PSSCH by the receiver UE. As another example, the transmitter UE may transmit a second repetition of the PSSCH when the UE receives acknowledgment feedback during the duration indicating failed reception of the first repetition of the PSSCH by the receiver UE.

Figure 8:
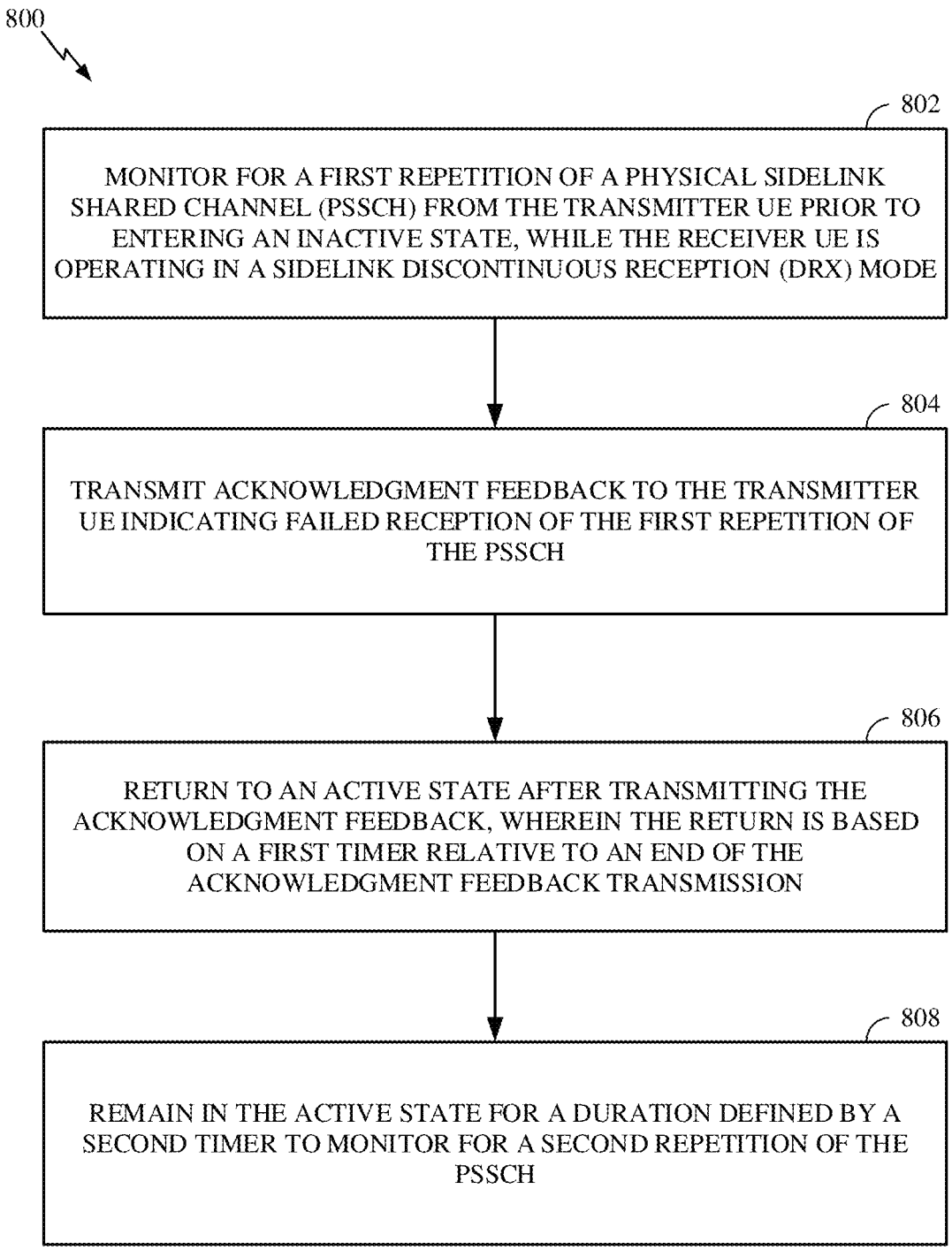
FIG. 8 illustrates example operations for wireless communications by a receiver UE, in accordance with certain aspects of the present disclosure.

FIG. 8 is a flow diagram illustrating example operations 800 for wireless communication by a receiver UE, in accordance with certain aspects of the present disclosure. The operations 800 may be performed, for example, by a receiver UE (e.g., UE 120a or 120b of FIG. 1 or UE 120a of FIG. 4) to handle timers in sidelink communication with a transmitter UE. The operations 800 may be implemented as software components that are executed and run on one or more processors (e.g., controller/processor 480 of FIG. 4). Further, the transmission and reception of signals by the receiver UE in operations 800 may be enabled, for example, by one or more antennas (e.g., antennas 452 of FIG. 4). In certain aspects, the transmission and/or reception of signals by the receiver UE may be implemented via a bus interface of one or more processors (e.g., controller/processor 480 of FIG. 4) obtaining and/or outputting signals. In some cases, the operations 800 performed by the receiver UE may be complementary to the operations 700 of FIG. 7 performed by the transmitter UE.

The operations 800 begin, at 802, by monitoring for a first repetition of a PSSCH from a transmitter UE prior to entering an inactive state, while the receiver UE is operating in a sidelink DRX mode.

At 804, the receiver UE transmits acknowledgment feedback to the transmitter UE indicating failed reception of the first repetition of the PSSCH.

At 806, the receiver UE returns to an active state after transmitting the acknowledgment feedback, wherein the return is based on a first timer relative to an end of the acknowledgment feedback transmission.

At 808, the receiver UE remains in the active state for a duration defined by a second timer to monitor for a second repetition of the PSSCH. In some cases, the first and second timers are set such that the receiver UE is in an active state when the transmitter UE transmits the second repetition of the PSSCH and/or such that the receiver UE is configured to send the acknowledgment feedback when the transmitter UE is in an active state.

Figure 9A:
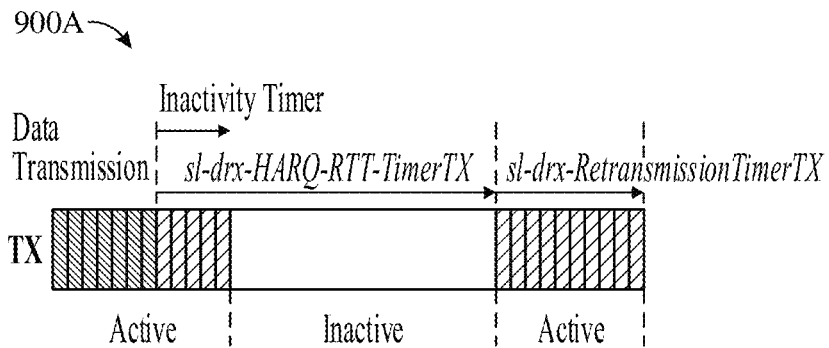
FIGS. 9A and 9B are exemplary general transmission timelines illustrating handling of hybrid automatic repeat request (HARQ) and retransmission timers during sidelink discontinuous reception (DRX) operations, in accordance with certain aspects of the present disclosure.
Figure 9B:
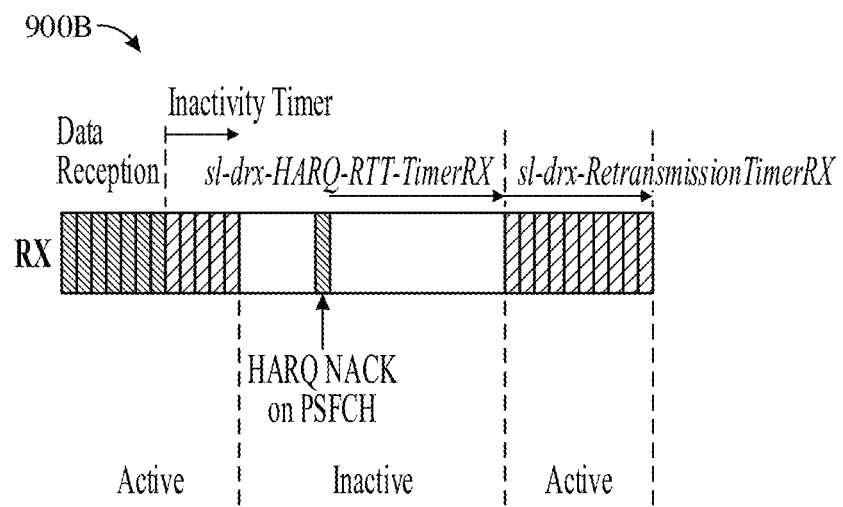

Operations 700 and 800 of FIGS. 7 and 8 may be understood with reference to FIGS. 9A and 9B, which show exemplary transmission timelines 900A and 900B illustrating handling of HARQ and retransmission timers during sidelink DRX operations, in accordance with certain aspects of the present disclosure. In other words, the timeline 900A corresponds to a transmitter UE (e.g., the transmitter UE performing the operations 700 of FIG. 7), while the timeline 900B corresponds to a receiver UE (e.g., the receiver UE performing the operations 800 of FIG. 8).

In certain aspects, the HARQ timer (e.g., sl-drx-HARQ-RTT-TimerTX) of the timeline 900A may specify the timing of a return to an active state (from an inactive state) relative to the end of a first repetition of a PSSCH transmission. When the transmitter UE returns to the active state (e.g., the sl-drx-HARQ-RTT-TimerTX has expired), the transmitter UE remains active for a period defined by the retransmission timer (e.g., sl-drx-RetransmissionTimerTX). In certain aspects, the transmitter UE may return to an inactive state if a retransmission request (e.g., a negative acknowledgement message (NACK)) is not received during this time window. As used herein, HARQ timer (of the transmitter UE and the receiver UE) and sl-drx-HARQ-RTT-TimerTX/sl-drx-HARQ-RTT-TimerRX may be used interchangeably. Further, as used herein, retransmission timer (of the transmitter UE and the receiver UE) and drx-RetransmissionTimerTX/drx-RetransmissionTimerRX may be used interchangeably. In certain aspects, the HARQ timer and/or the retransmission timer may be configured via signaling from a network entity (e.g., radio resource control (RRC) signaling from a network entity such as the gNB 110 of FIG. 1). In some cases, the HARQ timer and/or the retransmission timer may be configured via sidelink DRX configuration signaling between Tx and Rx UEs to share their respective sidelink DRX timer configuration values.

Referring now to the timeline 900B, if a receiver UE sends a NACK for the data on PSCCH, the receiver UE returns to an active state to receive the retransmission from the transmitter UE. As shown, the timer sl-drx-HARQ-RTT-TimerRX starts after the receiver UE has transmitted the NACK on PSCCH to the transmitter UE. Additionally, as shown, the receiver UE remains active for a period defined by the timer sl-drx-RetransmissionTimerRX while waiting to receive the retransmission.

Figure 10A:
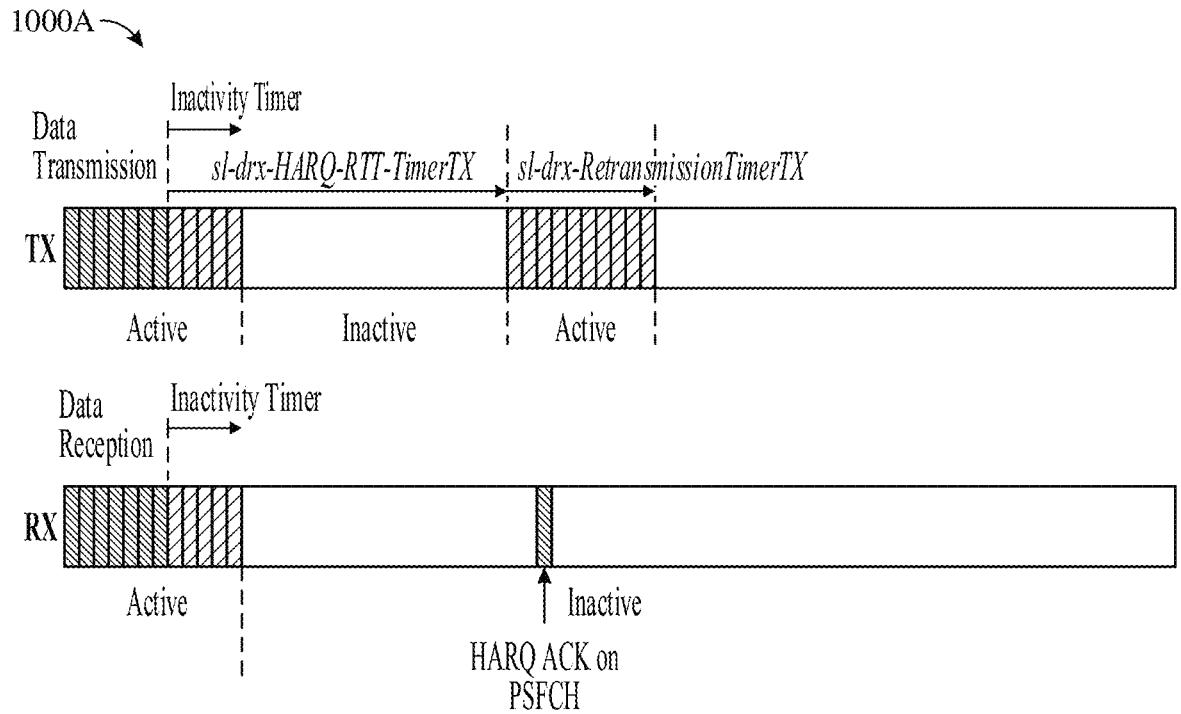
FIGS. 10A and 10B are exemplary transmission timelines illustrating handling of HARQ and retransmission timers based on whether a transmission was received successfully, in accordance with certain aspects of the present disclosure.
Figure 10B:
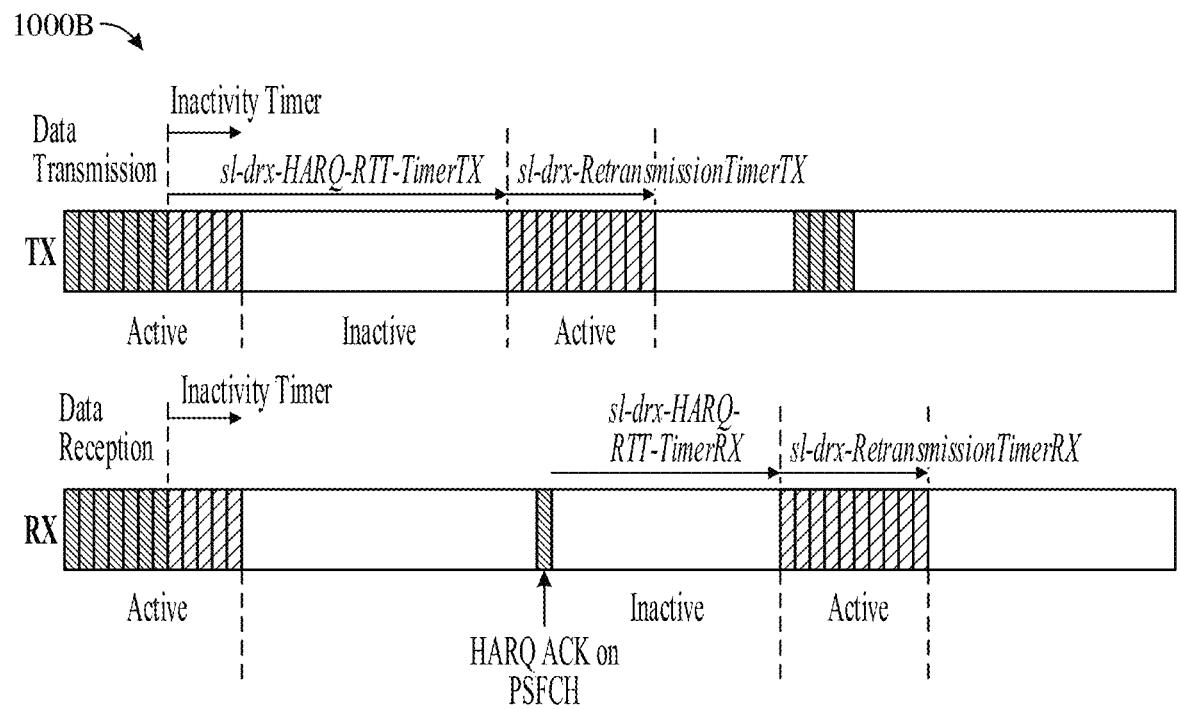

FIGS. 10A and 10B are exemplary transmission timelines 1000A and 1000B illustrating handling of HARQ and retransmission timers based on whether a transmission was received successfully, in accordance with certain aspects of the present disclosure.

As shown in the timeline 1000A, if the data reception at a receiver UE is successful, the receiver UE sends an ACK message to the transmitter UE, then both UEs return to the inactive state (e.g., the TX UE may return to inactive after expiration of the sl-drx-RetransmissionTimerTX timer). Further, the timers sl-drx-HARQ-RTT-TimerTX and sl-drx-RetransmissionTimerTX of the transmitter UE may be set so that the transmitter UE is active when the receiver UE sends the ACK message.

Referring now to the timeline 1000B, if the data reception at the receiver UE fails, the receiver UE sends a NACK message to the transmitter UE. In response, the transmitter UE retransmits the data, during the duration defined by the sl-drx-RetransmissionTimerRX timer. In other words, the timers sl-drx-HARQ-RTT-TimerTX and sl-drx-RetransmissionTimerTX of the transmitter UE may be set so that the transmitter UE is active when the receiver UE sends the NACK message. The timers sl-drx-HARQ-RTT-TimerRX and sl-drx-RetransmissionTimerRX of the receiver UE are set so that the receiver UE is active when the transmitter UE retransmits the data.

Figure 11A:
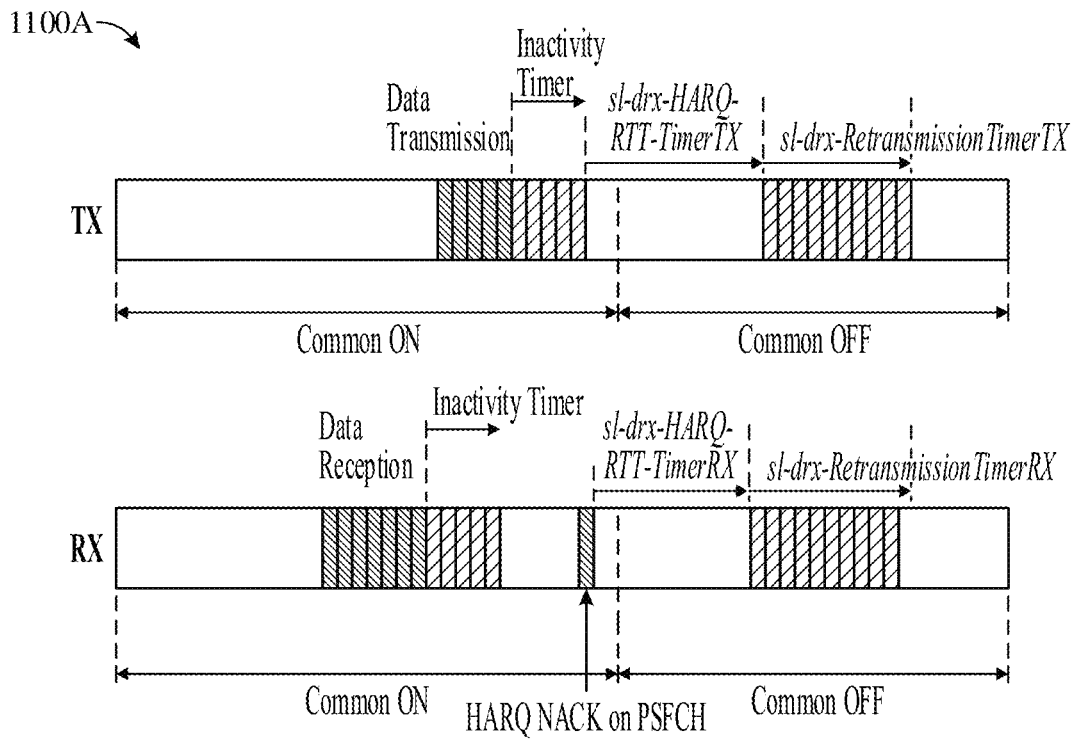
FIGS. 11A and 11B are exemplary transmission timelines illustrating extending of HARQ and/or retransmission timers through a common OFF period of sidelink DRX operations, in accordance with certain aspects of the present disclosure.
Figure 11B:
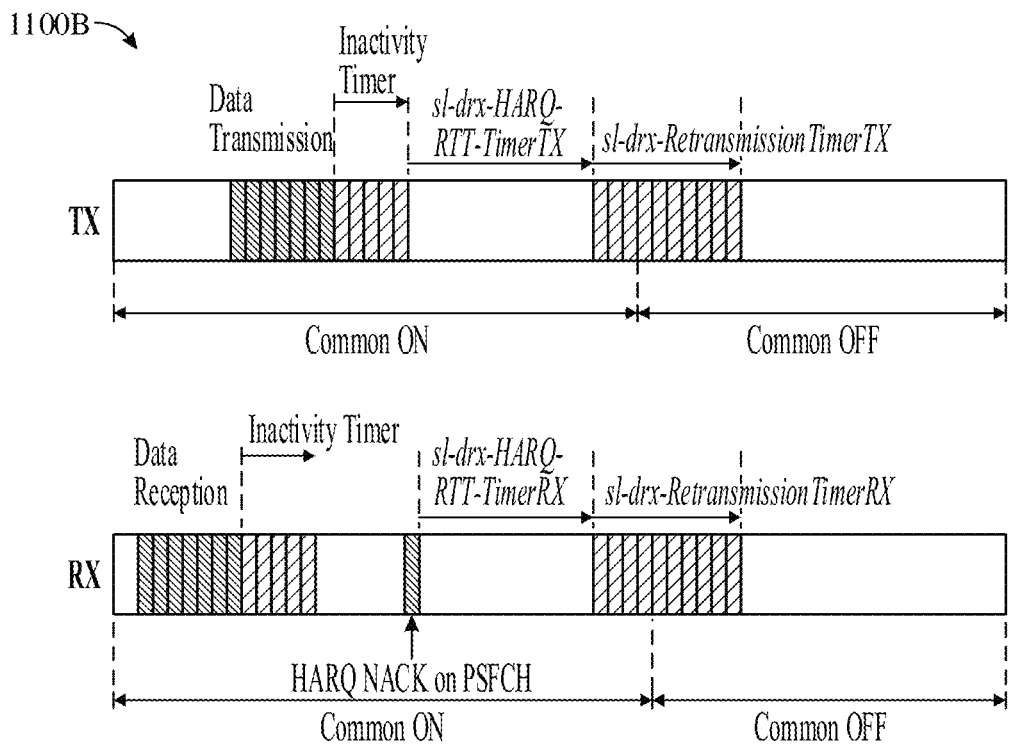

FIGS. 11A and 11B are exemplary transmission timelines 1100A and 1100B illustrating extending of HARQ and/or retransmission timers through a common OFF period of sidelink DRX operations, in accordance with certain aspects of the present disclosure.

As shown in the timeline 1100A, the timers sl-drx-HARQ-RTT-TimerTX of the transmitter UE and sl-drx-HARQ-RTT-TimerRX of the receiver UE may extend in to a common OFF period. In this case, a common OFF period may be understood to be a period during which both the transmitter UE and the receiver UE are in a DRX OFF state. Thus, the HARQ timer for each UE continues during the common OFF period, and each UE returns to an active state when the HARQ timers expire. Further, the UEs remain active before each respective retransmission timer expires.

Similarly, as shown in the timeline 1100B, the retransmission timers sl-drx-RetransmissionTimerTX and sl-drx-RetransmissionTimerRX of the transmitter UE and the receiver UE, respectively, extend/continue into the common OFF period. That is, each UE returns to the active state when the respective HARQ timers expire and remains active before retransmission timers expire and into the common OFF period.

Figure 12A:
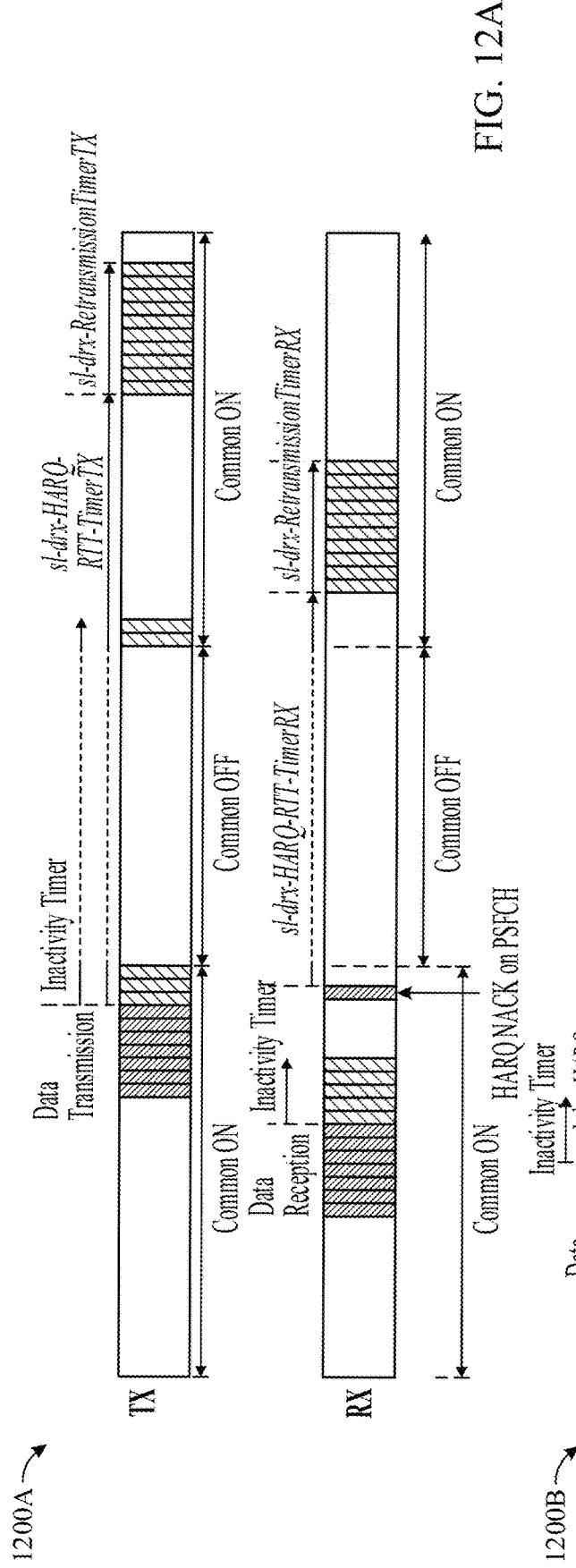
FIGS. 12A and 12B are exemplary transmission timelines illustrating pausing of HARQ and/or retransmission timers through a common OFF period of sidelink DRX operations, in accordance with certain aspects of the present disclosure.
Figure 12B:
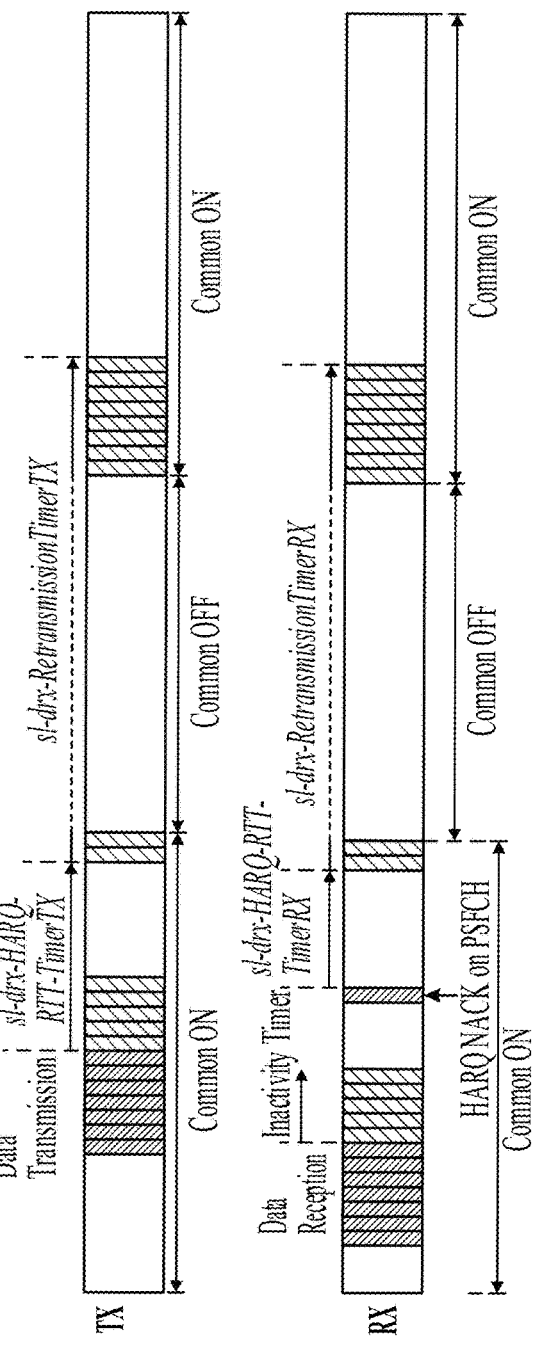

FIGS. 12A and 12B are exemplary transmission timelines 1200A and 1200B illustrating pausing of HARQ and/or retransmission timers through a common OFF period of sidelink DRX operations, in accordance with certain aspects of the present disclosure.

As shown in the timeline 1200A, the HARQ timers are paused during the common OFF period. That is, the HARQ timers are paused, but not stopped/terminated during the common OFF period. Accordingly, the HARQ timers are resumed at the beginning of the next common ON, and each UE returns to an active state when the HARQ timers expire, and remains active before its retransmission timer expires.

As shown in the timeline 1200B, the retransmission timers are paused (but not stopped/terminated) during the common OFF period, and resumed at the beginning of the next common ON duration. As described above, the UEs return to the active state when each respective HARQ timer expires, and each UE remains active before its retransmission timer expires.

Figure 13A:
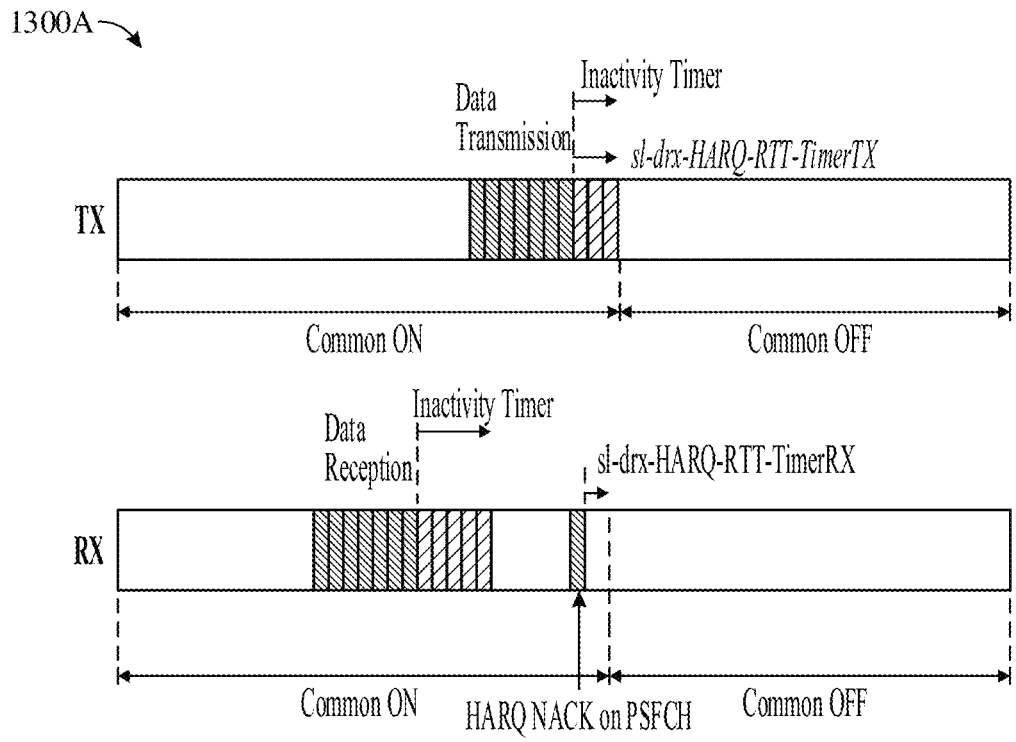
FIGS. 13A and 13B are exemplary transmission timelines illustrating expiration of HARQ and/or retransmission timers prior to a common OFF period, in accordance with certain aspects of the present disclosure.
Figure 13B:
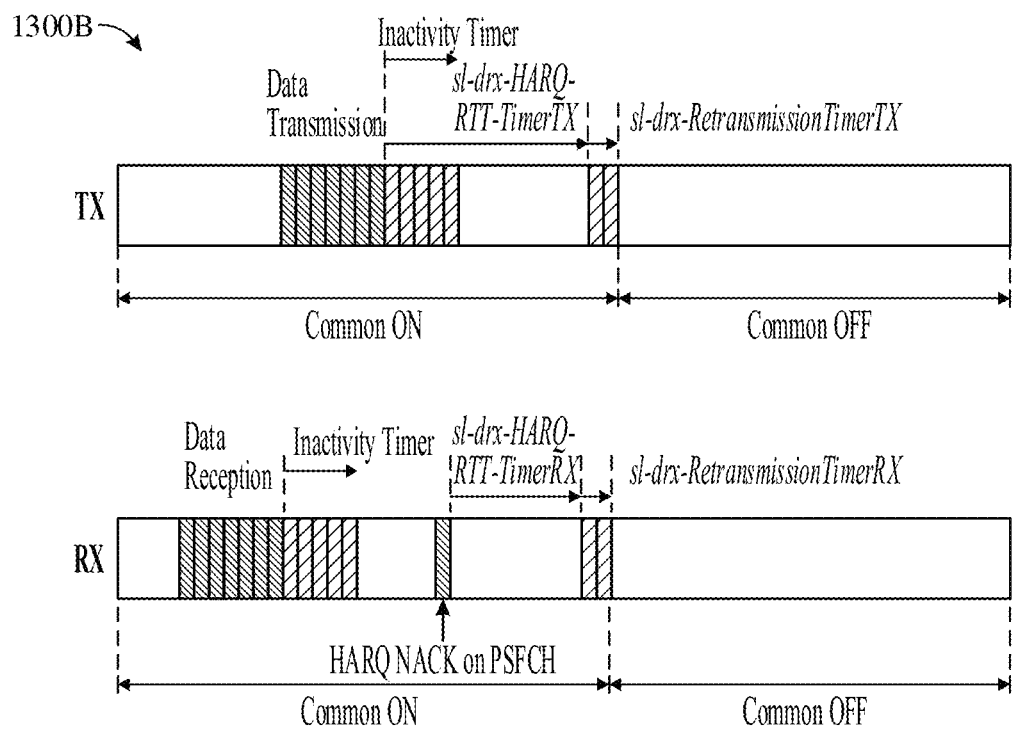

FIGS. 13A and 13B are exemplary transmission timelines 1300A and 1300B illustrating expiration of HARQ and/or retransmission timers prior to a common OFF period, in accordance with certain aspects of the present disclosure.

As shown in the timeline 1300A, the HARQ timer for each of the transmitter UE and the receiver UE expires at the beginning of common OFF, and the short/long sidelink DRX cycle starts at a subsequent (not shown) common ON duration. As shown in the timeline 1300B, the retransmission timer of each of the transmitter UE and the receiver UE expires at the beginning of common OFF, and the short/long sidelink DRX cycle starts at a subsequent (not shown) common ON duration (during which the TX UE and/or RX UE may be on). In each of the cases illustrated in the timelines 1300A and 1300B, the transmission/reception of the data fails.

Example Wireless Communication Devices

Figure 14:
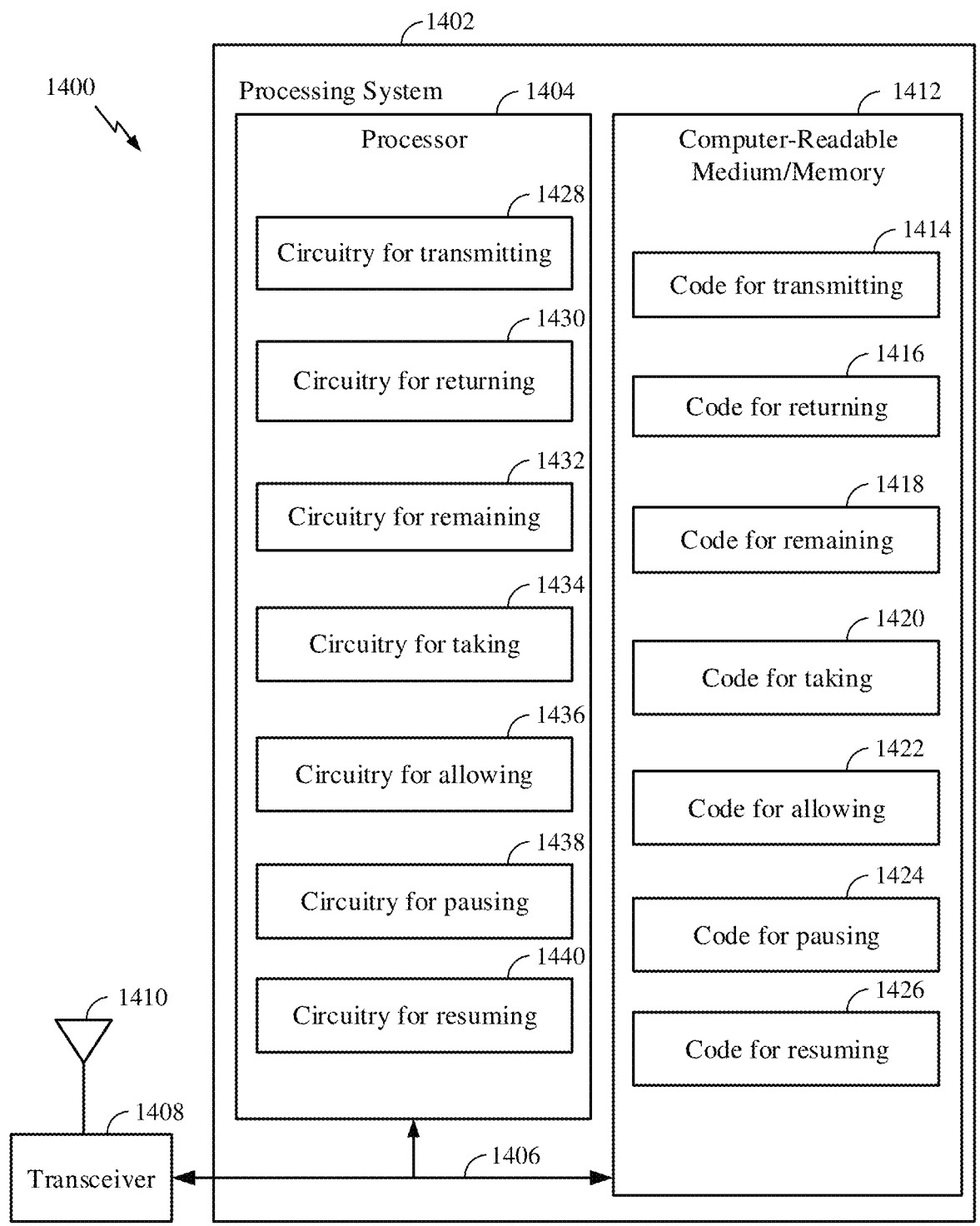
FIGS. 14-15 illustrate communications devices that may each include various components configured to perform the operations described herein, in accordance with certain aspects of the present disclosure.

FIG. 14 illustrates a communications device 1400 that may include various components (e.g., corresponding to means-plus-function components) configured to perform operations for the techniques disclosed herein, such as the operations 700 illustrated in FIG. 7.

Communications device 1400 includes a processing system 1402 coupled to a transceiver 1408 (e.g., a transmitter and/or a receiver). Transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by the processor 1404, cause the processor 1404 to perform the operations 700 illustrated in FIG. 7, or other operations for handling timers in sidelink discontinuous reception (DRX) communication. In certain aspects, the processor 1404 can include one or more components of UE 120a with reference to FIG. 4 such as controller/processor 480, transmit processor 464, receive processor 458, and/or the like. Additionally, in certain aspects, computer-readable medium 1412 can include one or more components of UE 120a with reference to FIG. 4 such as, for example, memory 482, and/or the like.

In certain aspects, computer-readable medium/memory 1412 stores code 1414 for transmitting; code 1416 for returning; code 1418 for remaining; code 1420 for taking; code 1422 for allowing; code 1424 for pausing; and code 1426 for resuming.

In some cases, code 1414 for transmitting may include code for transmitting a first repetition of a physical sidelink shared channel (PSSCH) transmission to a receiver UE prior to entering an inactive state, while the transmitter UE is operating in a sidelink discontinuous reception (DRX) mode.

In some cases, code 1416 for returning may include code for returning to an active state to monitor for acknowledgment feedback from the receiver UE, wherein the return is based on a first timer relative to an end of the first repetition of the PSSCH.

In some cases, code 1418 for remaining may include code for remaining in the active state for a duration defined by a second timer.

In some cases, code 1420 for taking may include code for taking one or more actions depending on whether the transmitter UE receives acknowledgment feedback during the duration indicating failed reception of the first repetition of the PSSCH by the receiver UE.

In some cases, code 1422 for allowing may include code for allowing at least one of the first or second timers to run during a common OFF period during which both the transmitter UE and the receiver UE are in a DRX OFF state.

In some cases, code 1424 for pausing may include code for pausing at least one of the first or second timers during a common OFF period during which both the transmitter UE and the receiver UE are in a DRX OFF state.

In some cases, code 1426 for resuming may include code for resuming at least one of the first or second timers during a subsequent common ON period during which at least one of the transmitter UE or the receiver UE is in a DRX ON state.

In certain aspects, the processor 1404 has circuitry configured to implement the code stored in the computer-readable medium/memory 1412. The processor 1404 includes circuitry 1428 for transmitting; circuitry 1430 for returning; circuitry 1432 for remaining; circuitry 1434 for taking; circuitry 1436 for allowing; circuitry 1438 for pausing; and circuitry 1440 for resuming.

In some cases, circuitry 1428 for transmitting may include circuitry for transmitting a first repetition of a PSSCH transmission to a receiver UE prior to entering an inactive state, while the transmitter UE is operating in a sidelink DRX mode.

In some cases, circuitry 1430 for returning may include circuitry for returning to an active state to monitor for acknowledgment feedback from the receiver UE, wherein the return is based on a first timer relative to an end of the first repetition of the PSSCH.

In some cases, circuitry 1432 for remaining may include code for remaining in the active state for a duration defined by a second timer.

In some cases, circuitry 1434 for taking may include circuitry for taking one or more actions depending on whether the transmitter UE receives acknowledgment feedback during the duration indicating failed reception of the first repetition of the PSSCH by the receiver UE.

In some cases, circuitry 1436 for allowing may include circuitry for allowing at least one of the first or second timers to run during a common OFF period during which both the transmitter UE and the receiver UE are in a DRX OFF state.

In some cases, circuitry 1438 for pausing may include circuitry for pausing at least one of the first or second timers during a common OFF period during which both the transmitter UE and the receiver UE are in a DRX OFF state.

In some cases, circuitry 1440 for resuming may include circuitry for resuming at least one of the first or second timers during a subsequent common ON period during which at least one of the transmitter UE or the receiver UE is in a DRX ON state.

In some cases, the operations 700 illustrated in FIG. 7, as well as other operations described herein, may be implemented by one or more means-plus-function components. For example, in some cases, such operations may be implemented by means for identifying and means for using.

In some cases, means for returning, means for remaining, means for taking, means for allowing, means for pausing, and means for resuming includes a processing system, which may include one or more processors, such as the receive processor 458, the transmit processor 464, the TX MIMO processor 466, and/or the controller/processor 480 of the UE 120a and/or UE 120b illustrated in FIG. 4 and/or the processing system 1402 of the communication device 1400 in FIG. 14.

Figure 15:
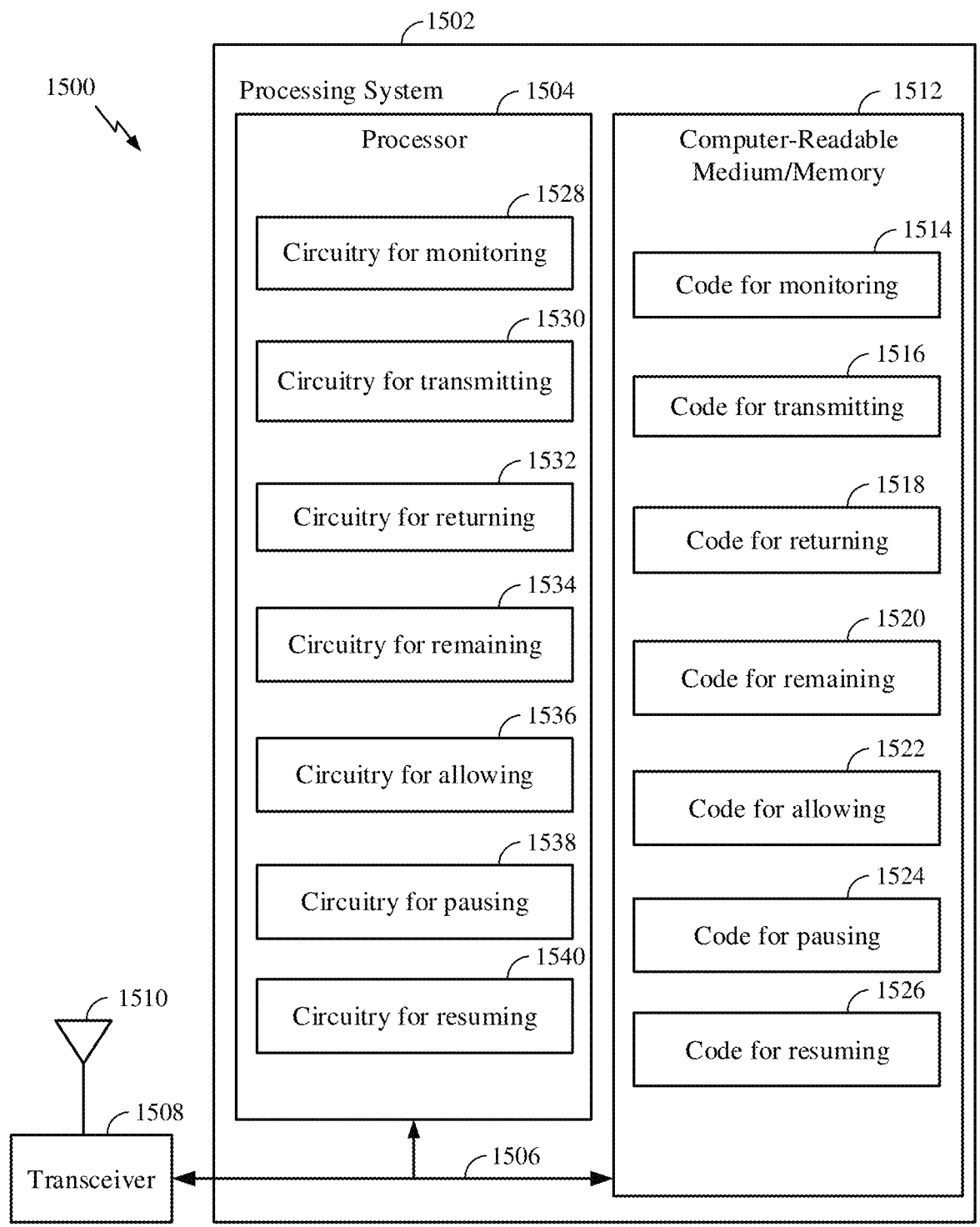

FIG. 15 illustrates a communications device 1500 that may include various components (e.g., corresponding to means-plus-function components) configured to perform operations for the techniques disclosed herein, such as the operations 700 illustrated in FIG. 8.

Communications device 1500 includes a processing system 1502 coupled to a transceiver 1508 (e.g., a transmitter and/or a receiver). Transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by the processor 1504, cause the processor 1504 to perform the operations 800 illustrated in FIG. 8, or other operations for handling timers in sidelink discontinuous reception (DRX) communication. In certain aspects, the processor 1504 can include one or more components of UE 120a with reference to FIG. 4 such as controller/processor 480, transmit processor 464, receive processor 458, and/or the like. Additionally, in certain aspects, computer-readable medium 1512 can include one or more components of UE 120a (and/or UE 120b) with reference to FIG. 4 such as, for example, memory 482, and/or the like.

In certain aspects, computer-readable medium/memory 1512 stores code 1514 for monitoring; code 1516 for transmitting; code 1518 for returning; code 1520 for remaining; code 1522 for allowing; code 1524 for pausing; and code 1526 for resuming.

In some cases, code 1514 for monitoring may include code for monitoring for a first repetition of a PSSCH from a transmitter UE prior to entering an inactive state, while the receiver UE is operating in a sidelink DRX mode.

In some cases, code 1516 for transmitting may include code for transmitting acknowledgment feedback to the transmitter UE indicating failed reception of the first repetition of the PSSCH.

In some cases, code 1518 for returning may include code for returning to an active state after transmitting the acknowledgment feedback, wherein the return is based on a first timer relative to an end of the acknowledgment feedback transmission.

In some cases, code 1520 for remaining may include code for remaining in the active state for a duration defined by a second timer to monitor for a second repetition of the PSSCH.

In some cases, code 1522 for allowing may include code for allowing at least one of the first or second timers to run during a common OFF period during which both the transmitter UE and the receiver UE are in a DRX OFF state.

In some cases, code 1524 for pausing may include code for pausing at least one of the first or second timers during a common OFF period during which both the transmitter UE and the receiver UE are in a DRX OFF state.

In some cases, code 1526 for resuming may include code for resuming at least one of the first or second timers during a subsequent common ON period during which at least one of the transmitter UE or the receiver UE is in a DRX ON state.

In certain aspects, the processor 1504 has circuitry configured to implement the code stored in the computer-readable medium/memory 1512. The processor 1504 includes circuitry 1528 for monitoring; circuitry 1530 for transmitting; circuitry 1532 for returning; circuitry 1534 for remaining; circuitry 1536 for allowing; circuitry 1538 for pausing; and circuitry 1540 for resuming.

In some cases, circuitry 1528 for monitoring may include circuitry for monitoring for a first repetition of a PSSCH from a transmitter UE prior to entering an inactive state, while the receiver UE is operating in a sidelink DRX mode.

In some cases, circuitry 1530 for transmitting may include circuitry for transmitting acknowledgment feedback to the transmitter UE indicating failed reception of the first repetition of the PSSCH.

In some cases, circuitry 1532 for returning may include circuitry for returning to an active state after transmitting the acknowledgment feedback, wherein the return is based on a first timer relative to an end of the acknowledgment feedback transmission.

In some cases, circuitry 1534 for remaining may include circuitry for remaining in the active state for a duration defined by a second timer to monitor for a second repetition of the PSSCH.

In some cases, circuitry 1536 for allowing may include circuitry for allowing at least one of the first or second timers to run during a common OFF period during which both the transmitter UE and the receiver UE are in a DRX OFF state.

In some cases, circuitry 1538 for pausing may include circuitry for pausing at least one of the first or second timers during a common OFF period during which both the transmitter UE and the receiver UE are in a DRX OFF state.

In some cases, circuitry 1540 for resuming may include circuitry for resuming at least one of the first or second timers during a subsequent common ON period during which at least one of the transmitter UE or the receiver UE is in a DRX ON state.

In some cases, the operations 800 illustrated in FIG. 8, as well as other operations described herein, may be implemented by one or more means-plus-function components. For example, in some cases, such operations may be implemented by means for identifying and means for using.

In some cases, means for returning, means for remaining, means for allowing, means for pausing, and means for resuming includes a processing system, which may include one or more processors, such as the receive processor 458, the transmit processor 464, the TX MIMO processor 466, and/or the controller/processor 480 of the UE 120a (and/or UE 120b) illustrated in FIG. 4 and/or the processing system 1502 of the communication device 1500 in FIG. 15.

Example Aspects

Implementation examples are described in the following numbered clauses:

Aspect 1: A method for wireless communications by a transmitter user equipment (UE), comprising transmitting a first repetition of a physical sidelink shared channel (PSSCH) transmission to a receiver UE prior to entering an inactive state, while the transmitter UE is operating in a sidelink discontinuous reception (DRX) mode; returning to an active state to monitor for acknowledgment feedback from the receiver UE, wherein the return is based on a first timer relative to an end of the first repetition of the PSSCH; remaining in the active state for a duration defined by a second timer; and taking one or more actions depending on whether the transmitter UE receives acknowledgment feedback during the duration indicating failed reception of the first repetition of the PSSCH by the receiver UE.

Aspect 2: The method of Aspect 1, wherein the one or more actions comprise returning to the inactive state unless the transmitter UE receives acknowledgment feedback during the duration indicating failed reception of the first repetition of the PSSCH by the receiver UE.

Aspect 3: The method of Aspect 1 or 2, wherein the one or more actions comprise transmitting a second repetition of the PSSCH when the transmitter UE receives acknowledgment feedback during the duration indicating failed reception of the first repetition of the PSSCH by the receiver UE.

Aspect 4: The method of Aspect 3, wherein the first and second timers are set such that the transmitter UE transmits the second repetition of the PSSCH when the receiver UE is in the active state.

Aspect 5: The method of any of Aspects 1-4, wherein the first and second timers are set such that the transmitter UE is in the active state when the receiver UE is configured to send the acknowledgment feedback.

Aspect 6: The method of any of Aspects 1-5, further comprising allowing at least one of the first or second timers to run during a common OFF period during which both the transmitter UE and the receiver UE are in a DRX OFF state.

Aspect 7: The method of any of Aspects 1-6, further comprising pausing at least one of the first or second timers during a common OFF period during which both the transmitter UE and the receiver UE are in a DRX OFF state.

Aspect 8: The method of Aspect 7, further comprising resuming at least one of the first or second timers during a subsequent common ON period during which both the transmitter UE and the receiver UE are in a DRX ON state.

Aspect 9: The method of any of Aspects 1-8, wherein, when the first timer expires at a beginning of a common OFF period during which both the transmitter UE and the receiver UE are in a DRX OFF state, the transmitter UE is configured to remain inactive until a subsequent common ON period during which at least one of the transmitter UE or the receiver UE is in a DRX ON state.

Aspect 10: The method of any of Aspects 1-9, wherein, when the second timer expires at a beginning of a common OFF period during which both the transmitter UE and the receiver UE are in a DRX OFF state, the transmitter UE is configured to remain inactive until a subsequent common ON period during which at least one of the transmitter UE or the receiver UE is in a DRX ON state.

Aspect 11: A method for wireless communications by a receiver UE, comprising monitoring for a first repetition of a PSSCH from a transmitter UE prior to entering an inactive state, while the receiver UE is operating in a sidelink DRX mode; transmitting acknowledgment feedback to the transmitter UE indicating failed reception of the first repetition of the PSSCH; returning to an active state after transmitting the acknowledgment feedback, wherein the return is based on a first timer relative to an end of the acknowledgment feedback transmission; and remaining in the active state for a duration defined by a second timer to monitor for a second repetition of the PSSCH.

Aspect 12: The method of Aspect 11, wherein the first and second timers are set such that the receiver UE is in the active state when the transmitter UE transmits the second repetition of the PSSCH.

Aspect 13: The method of Aspect 11 or 12, wherein the first and second timers are set such that the receiver UE is configured to send the acknowledgment feedback when the transmitter UE is in the active state.

Aspect 14: The method of any of Aspects 11-13, further comprising allowing at least one of the first or second timers to run during a common OFF period during which both the transmitter UE and the receiver UE are in a DRX OFF state.

Aspect 15: The method of any of Aspects 11-14, further comprising pausing at least one of the first or second timers during a common OFF period during which both the transmitter UE and the receiver UE are in a DRX OFF state.

Aspect 16: The method of Aspect 15, further comprising resuming at least one of the first or second timers during a subsequent common ON period during which at least one of the transmitter UE or the receiver UE is in a DRX ON state.

Aspect 17: The method of any of Aspects 11-16, wherein, when the first timer expires at a beginning of a common OFF period during which both the transmitter UE and the receiver UE are in a DRX OFF state, the receiver UE is configured to remain inactive until a subsequent common ON period during which at least one of the transmitter UE or the receiver UE is in a DRX ON state.

Aspect 18: The method of any of Aspects 11-17, wherein, when the second timer expires at a beginning of a common OFF period during which both the transmitter UE and the receiver UE are in a DRX OFF state, the receiver UE is configured to remain inactive until a subsequent common ON period during which at least one of the transmitter UE or the receiver UE is in a DRX ON state.

Aspect 19: An apparatus for wireless communication by a UE, comprising a memory and at least one processor coupled to the memory, the memory and the at least one processor being configured to perform any of the operations of Aspects 1-18.

Aspect 20: An apparatus for wireless communication by a UE, comprising means for performing any of the operations of Aspects 1-18.

Aspect 21: A computer readable medium having instructions stored thereon for performing any of the operations of Aspects 1-18.

Additional Considerations

The preceding description provides examples of utilizing physical resource blocks (PRBs) that do not belong to a sub-channel in sidelink, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5g NR), 3GPP Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 7 and 8 may be performed by various processors shown in FIG. 4, such as processors 466, 458, 464, and/or controller/processor 480 of the UE 120a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter user equipment (UE), comprising:
   transmitting a first repetition of a physical sidelink shared channel (PSSCH) transmission to a receiver UE prior to entering an inactive state, while the transmitter UE is operating in a sidelink discontinuous reception (DRX) mode;

allowing or pausing, during a common OFF period during which both the transmitter UE and the receiver UE are in a DRX OFF state, at least one of a first timer relative to an end of the first repetition of the PSSCH or a second timer;

returning to an active state to monitor for acknowledgment feedback from the receiver UE, wherein the return is based on the first timer;

remaining in the active state for a duration defined by the second timer; and taking one or more actions depending on whether the transmitter UE receives acknowledgment feedback during the duration indicating failed reception of the first repetition of the PSSCH by the receiver UE.

2. The method of claim 1, wherein the one or more actions comprise returning to the inactive state unless the transmitter UE receives acknowledgment feedback during the duration indicating failed reception of the first repetition of the PSSCH by the receiver UE.

3. The method of claim 1, wherein the one or more actions comprise transmitting a second repetition of the PSSCH when the transmitter UE receives acknowledgment feedback during the duration indicating failed reception of the first repetition of the PSSCH by the receiver UE.

4. The method of claim 3, wherein the first and second timers are set to allow the transmitter UE to transmit the second repetition of the PSSCH when the receiver UE is in the active state.

5. The method of claim 1, wherein the first and second timers are set to allow the transmitter UE to operate in the active state when the receiver UE is configured to send the acknowledgment feedback.

6. The method of claim 1, further comprising allowing at least one of the first or second timers to run during the common OFF period.

7. The method of claim 1, further comprising pausing at least one of the first or second timers during the common OFF period.

8. The method of claim 7, further comprising resuming at least one of the first or second timers during a subsequent common ON period during which at least one of the transmitter UE or the receiver UE is in a DRX ON state.

9. The method of claim 1, wherein, when the first timer expires at a beginning of the common OFF period the transmitter UE is configured to remain inactive until a subsequent common ON period during which at least one of the transmitter UE or the receiver UE is in a DRX ON state.

10. The method of claim 1, wherein, when the second timer expires at a beginning of the common OFF period, the transmitter UE is configured to remain inactive until a subsequent common ON period during which at least one of the transmitter UE or the receiver UE is in a DRX ON state.

11. A method for wireless communications by a receiver user equipment (UE), comprising:

monitoring for a first repetition of a physical sidelink shared channel (PSSCH) from a transmitter UE prior to entering an inactive state, while the receiver UE is operating in a sidelink discontinuous reception (DRX) mode;

transmitting acknowledgment feedback to the transmitter UE indicating failed reception of the first repetition of the PSSCH;

allowing or pausing, during a common OFF period during which both the transmitter UE and the receiver UE are in a DRX OFF state, at least one of a first timer relative to an end of the acknowledgment feedback of the PSSCH or a second timer;

returning to an active state after transmitting the acknowledgment feedback, wherein the return is based on the first timer; and remaining in the active state for a duration defined by the second timer to monitor for a second repetition of the PSSCH.

12. The method of claim 11, wherein the first and second timers are set to allow the receiver UE to operate in the active state when the transmitter UE transmits the second repetition of the PSSCH.

13. The method of claim 11, wherein the first and second timers are that to allow the receiver UE to send the acknowledgment feedback when the transmitter UE is in the active state.

14. The method of claim 11, further comprising allowing at least one of the first or second timers to run during the common OFF period.

15. The method of claim 11, further comprising pausing at least one of the first or second timers during the common OFF period.

16. The method of claim 15, further comprising resuming at least one of the first or second timers during a subsequent common ON period during which at least one of the transmitter UE or the receiver UE is in a DRX ON state.

17. The method of claim 11, wherein, when the first timer expires at a beginning of the common OFF period, the receiver UE is configured to remain inactive until a subsequent common ON period during which at least one of the transmitter UE or the receiver UE is in a DRX ON state.

18. The method of claim 11, wherein, when the second timer expires at a beginning of the common OFF period, the receiver UE is configured to remain inactive until a subsequent common ON period during which at least one of the transmitter UE or the receiver UE is in a DRX ON state.

19. An apparatus for wireless communication by a transmitter UE, comprising:

a memory; and at least one processor coupled to the memory, the memory and the at least one processor being configured to:

transmit a first repetition of a physical sidelink shared channel (PSSCH) to a receiver UE prior to entering an inactive state, while the transmitter UE is operating in a sidelink discontinuous reception (DRX) mode;

allow or pause, during a common OFF period during which both the transmitter UE and the receiver UE are in a DRX OFF state, at least one of a first timer relative to an end of the first repetition of the PSSCH or a second timer;

return to an active state to monitor for acknowledgment feedback from the receiver UE, wherein the return is based on the first timer;

remain in the active state for a duration defined by the second timer; and take one or more actions depending on whether the transmitter UE receives acknowledgment feedback during the duration indicating failed reception of the first repetition of the PSSCH by the receiver UE.

20. The apparatus of claim 19, wherein the one or more actions comprise returning to the inactive state unless the transmitter UE receives acknowledgment feedback during the duration indicating failed reception of the first repetition of the PSSCH by the receiver UE.

21. The apparatus of claim 19, wherein the one or more actions comprise transmitting a second repetition of the PSSCH when the transmitter UE receives acknowledgment feedback during the duration indicating failed reception of the first repetition of the PSSCH by the receiver UE.

22. The apparatus of claim 21, wherein the first and second timers are set to allow the transmitter UE to transmit the second repetition of the PSSCH when the receiver UE is in the active state.

23. The apparatus of claim 19, wherein the first and second timers are set to allow the transmitter UE to operate in the active state when the receiver UE is configured to send the acknowledgment feedback.

24. The apparatus of claim 19, wherein the memory and the at least one processor are further configured to allow at least one of the first or second timers to run during the common OFF period.

25. An apparatus for wireless communication by a receiver UE, comprising:
  a memory; and
  at least one processor coupled to the memory, the memory and the at least one processor being configured to:
    monitor for a first repetition of a physical sidelink shared channel (PSSCH) from a transmitter UE prior to entering an inactive state, while the receiver UE is operating in a sidelink discontinuous reception (DRX) mode;
    transmit acknowledgment feedback to the transmitter UE indicating failed reception of the first repetition of the PSSCH;
    allow or pause, during a common OFF period during which both the transmitter UE and the receiver UE are in a DRX OFF state, at least one of a first timer relative to an end of transmission of the acknowledgement feedback or a second timer;
    return to an active state after transmitting the acknowledgment feedback, wherein the return is based on the first timer; and
    remain in the active state for a duration defined by the second timer to monitor for a second repetition of the PSSCH.

26. The apparatus of claim 25, wherein the first and second timers are set to allow the receiver UE to operate in the active state when the transmitter UE transmits the second repetition of the PSSCH.

27. The apparatus of claim 25, wherein the first and second timers are set to allow the receiver UE to send the acknowledgment feedback when the transmitter UE is in the active state.

28. The apparatus of claim 25, wherein the memory and the at least one processor are further configured to allow at least one of the first or second timers to run during the common OFF period.

29. The apparatus of claim 25, wherein the memory and the at least one processor are further configured to pause at least one of the first or second timers during the common OFF period.

30. The apparatus of claim 29, wherein the memory and the at least one processor are further configured to resume at least one of the first or second timers during a subsequent common ON period during which at least one of the transmitter UE or the receiver UE is in a DRX ON state.

* * * * *